(12) United States Patent
Handique et al.

(10) Patent No.: US 6,911,183 B1
(45) Date of Patent: Jun. 28, 2005

(54) MOVING MICRODROPLETS

(75) Inventors: Kalyan Handique, Ann Arbor, MI (US); Bishnu Gogoi, Scottsdale, AZ (US); Mark A. Burns, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 09/518,895

(22) Filed: Mar. 6, 2000

Related U.S. Application Data

(60) Division of application No. 08/938,689, filed on Sep. 26, 1997, now Pat. No. 6,130,098, which is a continuation-in-part of application No. 08/888,309, filed on Jul. 3, 1997, now Pat. No. 6,048,734, which is a continuation-in-part of application No. 08/529,293, filed on Sep. 15, 1995, now Pat. No. 6,057,149.

(51) Int. Cl.$^7$ .............................. G01N 1/10; G01N 1/18
(52) U.S. Cl. ........................ 422/102; 422/56; 422/58; 422/81; 422/82; 422/100; 436/52; 436/53; 436/180
(58) Field of Search .............................. 422/56, 58, 81, 422/82, 102, 100; 436/52, 53, 180

(56) References Cited

U.S. PATENT DOCUMENTS

| | | | |
|---|---|---|---|
| 3,799,742 A | 3/1974 | Coleman | 23/253 R |
| 4,439,526 A | 3/1984 | Columbus | 436/180 |
| 4,457,329 A | 7/1984 | Werley et al. | 137/73 |
| 4,522,786 A | 6/1985 | Ebersole | 422/56 |

FOREIGN PATENT DOCUMENTS

| FR | 2672301 | 7/1992 |
|---|---|---|

OTHER PUBLICATIONS

Marmur and Lane,"Strand Separation and Specific Recombination in Deoxyribonucleic Acids: Biological Studies", Proc.Nat.Acad.Sci., U.S.A. 46:453–461 (1960).

Doty et al.,"Strand Separation and Specific Recombination in Deoxyribonucleic Acids:Physical Chemical Studies", Proc.Nat.Acad.Sci., U.S.A. 46:461–477 (1960).

Hayashi et al.,"Restriction of in Vivo Genetic Transcription to one of the Complementary Strands of DNA", Proc.Nat. Acad.Sci., U.S.A. 50: 664–671 (1963).

Smith and Wilcox, "A Restriction Enzyme from Hemophilus influenzae", J.Mol.Biol. 51:379–391 (1970).

Southern, "Detection of Specific Sequences Among DNA Fragments Separated by Gel Electrophoresis", J.Mol.Biol. 98:503–517 (1975).

Maxam and Gilbert, "A new method for sequencing DNA", Proc. Natl. Acad Sci. USA 74:560–564(1977).

Sanger et al., "DNA sequencing with chain–terminating inhibitors", Proc. Natl. Acad Sci. USA 74:5463–5467 (1977).

Sambrook, J. et al., Molecular Cloning, A Laboratory Manual, 2d Ed. Cold Spring Harbor Laboratory Press, New York, 13.7–13.9.

Hunkapiller, M.W., "Advances in DNA sequencing technology", Curr. Op. Gen. Devl. 1:88–92 (1991).

(Continued)

Primary Examiner—Jan M. Ludlow
(74) Attorney, Agent, or Firm—Medlen & Carroll, LLP

(57) ABSTRACT

The movement and mixing of microdroplets through microchannels is described employing microscale devices, comprising microdroplet transport channels, reaction regions, electrophoresis modules, and radiation detectors. The discrete droplets are differentially heated and propelled through etched channels. Electronic components are fabricated on the same substrate material, allowing sensors and controlling circuitry to be incorporated in the same device.

5 Claims, 33 Drawing Sheets

U.S. PATENT DOCUMENTS

| | | | |
|---|---|---|---|
| 4,599,315 A | 7/1986 | Terasaki et al. | 435/301 |
| 4,683,195 A | 7/1987 | Mullis et al. | 435/6 |
| 4,683,202 A | 7/1987 | Mullis et al. | 435/91 |
| 4,919,892 A | 4/1990 | Plumb et al. | 422/58 |
| 4,963,498 A | 10/1990 | Hillman et al. | 436/69 |
| 4,967,950 A | 11/1990 | Legg | 228/180.2 |
| 5,048,554 A | 9/1991 | Kremer | 137/69 |
| 5,091,328 A | 2/1992 | Miller | 437/52 |
| 5,160,945 A | 11/1992 | Drake | 346/140 |
| 5,192,507 A | 3/1993 | Taylor et al. | 422/68.1 |
| 5,223,226 A | 6/1993 | Wittmer et al. | 422/100 |
| 5,252,743 A | 10/1993 | Barrett et al. | 548/303.7 |
| 5,275,787 A | 1/1994 | Yuguchi et al. | 422/82.08 |
| 5,304,487 A | 4/1994 | Wilding et al. | 435/291 |
| 5,364,591 A | 11/1994 | Green et al. | 422/58 |
| 5,376,252 A * | 12/1994 | Ekstrom et al. | 204/603 |
| 5,416,000 A | 5/1995 | Allen et al. | 435/7.92 |
| 5,474,796 A | 12/1995 | Brennan | 427/2.13 |
| 5,494,639 A | 2/1996 | Grzegorzewski | 422/82.01 |
| 5,498,392 A | 3/1996 | Wilding et al. | 422/68.1 |
| 5,533,412 A | 7/1996 | Jerman et al. | 73/861.95 |
| 5,585,069 A | 12/1996 | Zanzucchi et al. | 422/100 |
| 5,587,128 A | 12/1996 | Wilding et al. | 422/50 |
| 5,637,469 A * | 6/1997 | Wilding et al. | 435/7.21 |
| 5,651,839 A | 7/1997 | Rauf | 148/95 |
| 5,660,993 A | 8/1997 | Cathy et al. | 435/7.9 |
| 5,700,637 A | 12/1997 | Southern | 435/6 |
| 5,922,591 A * | 7/1999 | Anderson et al. | 435/287.2 |
| 6,319,469 B1 * | 11/2001 | Mian et al. | 422/64 |
| 6,379,929 B1 * | 4/2002 | Burns et al. | 435/91.2 |

OTHER PUBLICATIONS

Tabor et al., "DNA sequence analysis with a modified bacteriophage T7 DNA polymerase", *Proc. Natl. Acad. Sci. USA* 84:4767–4771 (1987).

Innis et al., "DNA sequencing with *Thermus aquaticus* DNA polymerase and direct sequencing of polymerase chain reaction–amplified DNA", *Proc. Natl. Acad. Sci. USA* 85:9436–9440 (1988).

J. Pfahler et al.,"Liquid Transport in Micron and Submicron Channels", *Sensors and Actuators* A21–A23: 431–434 (1990).

H.T.G. Van Lintel et al., "A Piezoelectric Micropump Based on Micromachining of Silicon", *Sensors and Actuators* 15:153–167 (1988).

Smits, "Piezoelectric Micropump with Three Valves Working Peristaltically," *Sensors and Actuators* A21–A23:203–206 (1990).

Mullis and Faloona, "Specific Synthesis of DNA in Vitro via a Polymerase–Catalyzed Chain Reaction," *Meth. Enzym.* 155:335–350 (1987).

Arnheim, "Polymerase Chain Reaction Strategy," *Annu. Rev. Biochem.* 61:131–156 (1992).

Nickerson et al., "Automated DNA diagnostics using an ELISA–based oligonucleotide ligation assay," *Proc. Nat. Acad. Sci. USA* 87:8923–8927 (1990).

Gordon et al., "Capillary Electrophoresis," *Science* 27:224–228 (1988).

Lawrence Berkeley Lab Presentation, Park City, Utah (1993).

Turner, "New Dimensions in Capillary Electrophoresis Columns," *LC–GC* vol. 9 (1991).

Heller and Tullis, "Microelectrophoresis for the separation of DNA fragments," *Electrophoresis* 13:512–520 (1992).

Manz et al., "Planar chips technology for miniaturization and integration of separation techniques into monitoring systems Capillary electrophoresis on a chip," *J. Chrom.* 593:253–258 (1992).

Jorgenson and Lukacs, "High–Resolution Separations Based on Electrophoresis and Electroosmosis," *J. Chrom.* 218:209–216 (1981).

Ansorge et al., "High–throughput automated DNA sequencing facility with fluorescent labels at the European Molecular Biology Laboratory," *Electrophoresis* 13:616–619 (1992).

Pentoney et al., "A single–fluor approach to DNA sequence determination using high performance capillary electrophoresis," *Electrophoresis* 13:467–474 (1992).

Tenan et al., "Friction in Capillary Systems," *Journal of Applied Physics* 53:6687–6692 (1982).

Dussan, "On the Spreading of Liquids on Solid Surfaces Static and Dynamic Contact Lines," *Annual Review of Fluid Mechanics* 11:371–400 (1979).

Probstein, *"Physicochemical Hydrodynamics,"* Butterworths Series in Chemical Engineering ed. H. Brenner (1989).

R.F. Service, "The Incredible Shrinking Laboratory," *Science* 268:26–27 (1995).

Presentation at Cold Spring Harbor (Aug. 31–Sep. 2, 1995).

R. Nowak, "Xeroxing DNA Analysis".

Manz, A. et al., "Electroosmotic pumping and electrophoretic separations for miniaturized chemical analysis systems" *J. Micromech. Microeng.* 4:257–265 (1994).

Hieptas, P.B. et al., "Ultrathin Slab Gel Separations of DNA Using Single Capillary Sample Introduction System" *Anal. Chem.*, 69:2292–2298 (1997).

Z. Liang et al., "Microfabrication of a Planar Absorbance and Florescence and Fluorescence Cell for Integrated Capillary Electrophoresis Devices," Anal. Chem. 68:1040–1046 (1996).

Wooley and Mathies, "Ultra–High–Speed DNA Sequencing Using Capillary Electrophoresis Chips," *Anal. Chem.* 67:3676–3680 (1995).

Effenhauser et al., "Manipulation of Sample Fractions on a Capillary Electrophoresis Chip," *Anal. Chem.* 67:2284–2287 (1995).

Van der Moolen, J.N. et al., "A Michromachined Injection Device for CZE: Application to Correlation CZE" *Anal. Chem.*, 69:4220–4225 (1997).

Chiu et al. "Injection of Ultrasmall Samples and Single Molecules into Tapered Capillaries" *Anal. Chem.* 69:1801–1807 (1997).

* cited by examiner

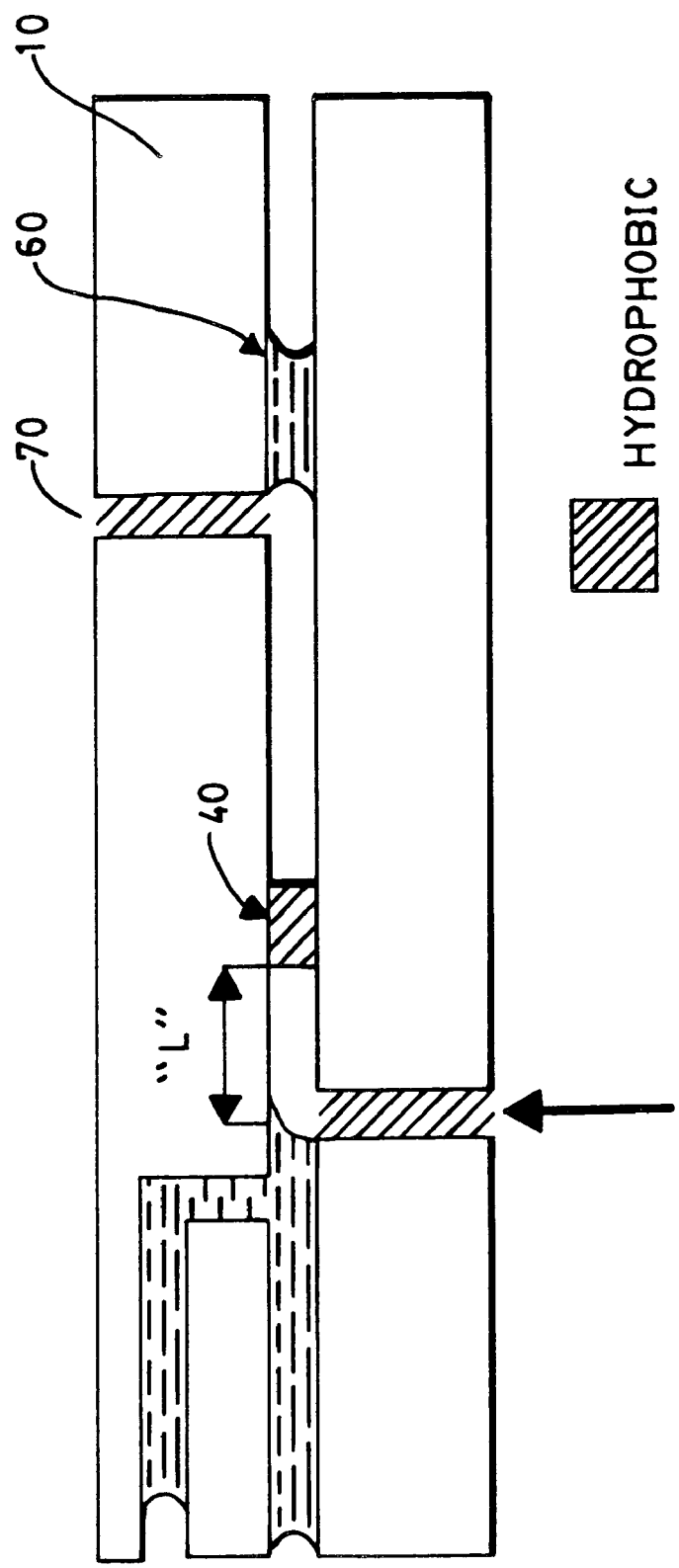

SiO2    Al    SiOx    SixNy

PCR RESULTS WITH STANDARD REAGENT AMOUNTS

991

991

991

MOVING MICRODROPLETS

This is a Divisional of application(s) 08/938,689 filed on Sep. 26, 1997, now U.S. Pat. No. 6,130,098, which is a continuation-in-part of application 08/888,309, filed on Jul. 3, 1997, now U.S. Pat. No. 6,048,734, which is a continuation-in part of application Ser. No. 08/529,293, filed on Sep. 15, 1995 now U.S. Pat. No. 6,057,149.

This invention was made with government support awarded by the National Institutes of Health (grant numbers NIH-R01-HG01044 and NIH-R01-HG01406). The government has certain rights in the invention.

FIELD OF THE INVENTION

The present invention relates to movement of microdroplets through microchannels, and more particularly, compositions, devices and methods to control microdroplet size and movement.

BACKGROUND

The complexity and power of biological reactions has increased dramatically over the last thirty years. The initial observations of the "hybridization" process, i.e., the ability of two polymers of nucleic acid containing complementary sequences to find each other and anneal through base pairing interaction, by Marmur and Lane, *Proc. Nat. Acad. Sci., U.S.A.* 46, 453 (1960) and Doty et al., *Proc. Nat. Acad. Sci., U.S.A.* 46, 461 (1960), have been followed by the refinement of this process into an essential tool of modern biology.

Initial hybridization studies, such as those performed by Hayashi et al., *Proc. Nat. Acad. Sci., USA.* 50, 664 (1963), were formed in solution. Further development led to the immobilization of the target DNA or RNA on solid supports. With the discovery of specific restriction endonucleases by Smith and Wilcox, *J. Mol. Biol.* 51, 379 (1970), it became possible to isolate discrete fragments of DNA. Utilization of immobilization techniques, such as those described by Southern, *J. Mol. Biol.* 98, 503 (1975), in combination with restriction enzymes, has allowed for the identification by hybridization of singly copy genes among a mass of fractionated, genomic DNA.

In 1977, two methods for DNA sequencing were reported. These were the chemical degradation method of Maxam and Gilbert, *Proc. Nat. Acad. Sci. USA.* 74:560 (1977) and the enzymatic method of Sanger et al., *Proc. Nat. Acad. Sci. USA.* 74:5463 (1977). Both methods generate populations of radiolabeled oligonucledtides which begin at a fixed point and terminate randomly at a fixed residue or type of residue. These populations are resolved on polyacrylamide gels which allow the discrimination between oligonucleotides that differ in length by as little as one nucleotide.

The Maxam and Gilbert method utilizes a fragment of DNA radiolabeled at one end which is partially cleaved in five separate chemical reactions, each of which is specific for a particular base or type of base. The products of these chemical reactions are five populations of labelled molecules that extend from the labeled end to the site of chemical cleavage. This method has remained relatively unchanged since its initial development. This method works best for DNA sequences that lie less than 250 nucleotides from the labeled end.

In contrast, the Sanger method is capable of sequencing greater than 500 nucleotides in a single set of reactions. The Sanger method is an enzymatic reaction that utilizes chain-terminating dideoxynucleotides (ddNTPs). ddNTPs are chain-terminating because they lack a 3'-hydroxyl residue which prevents formation of a phosphodiester bond with the succeeding deoxyribonucleotide (dNTP). A small amount of one ddNTP is included with the four conventional dNTPs in a polymerization reaction. Polymerization or DNA synthesis is catalyzed by a DNA polymerase. There is competition between extension of the chain by incorporation of the conventional dNTPs and termination of the chain by incorporation of a ddNTP. A short oligonucleotide or primer is annealed to a template containing the DNA to be sequenced. The original protocols required single-stranded DNA templates. The use of double-stranded templates was reported later. The primer provides a 3' hydroxyl group which allows the polymerization of a chain of DNA when a polymerase enzyme and dNTPs are provided.

The original version of the Sanger method utilized the Klenow fragment of *E. coli* DNA polymerase. This enzyme has the polymerization and 3' to 5' exonuclease activity of the unmodified polymerase but lacks 5' to 3' exonuclease activity. The Klenow fragment has several limitations when used for enzymatic sequencing. One limitations is the low processivity of the enzyme, which generates a high background of fragments that terminate by the random dissociation of the enzyme from the template rather than by the desired termination due to incorporation of a ddNTP. The low processivity also means that the enzyme cannot be used to sequence nucleotides that appear more than ~250 nucleotides from the 5' end of the primer. A second limitation is that Klenow cannot efficiently utilize templates which have homopolymer tracts or regions of high secondary structure. The problems caused by secondary structure in the template can be minimized by running the polymerization reaction at 55° C.

Improvements to the original Sanger method include the use of polymerases other than the Klenow fragment. Reverse transcriptase has been used to sequence templates that have homopolymeric tracts. Reverse transcriptase is somewhat better than the Klenow enzyme at utilizing templates containing homopolymer tracts.

The use of a modified T7 DNA polymerase (Sequenase™) was the most significant improvement to the Sanger method. See Sambrook, J. et al. Molecular Cloning, A Laboratory Manual, 2d Ed. Cold Spring Harbor Laboratory Press, New York, 13.7–13.9 and Hunkapiller, M. W. (1991) *Curr. Op. Gen. Devi.* 1:88–92. Sequenase™ is a chemically-modified T7 DNA polymerase has reduced 3' to 5' exonuclease activity. Tabor et al., *Proc. Natl. Acad. Sci. U.S.A.* 84:4767 (1987). Sequenase™ version 2.0 is a genetically engineered form of the T7 polymerase which completely lacks 3' to 5' exonticlease activity. Sequenase™ has a very high processivity and high rate of polymerization. It can efficiently incorporate nucleotide analogs such as dITP and 7-deaza-dGTP which are used to resolve regions of compression in sequencing gels. In regions of DNA containing a high G+C content, Hoogsteen bond formation can occur which leads to compressions in the DNA. These compressions result in aberrant migration patterns of oligonucleotide strands on sequencing gels. Because these base analogs pair weakly with conventional nucleotides, intrastrand secondary structures are alleviated. In contrast, Klenow does not incorporate these analogs as efficiently. The main limitation to the amount of DNA sequence that can be obtained from a single set of chain-termination reactions using Sequenase™ is the resolving power of polyacrylamide gels, not the properties of the enzyme.

The use of Taq DNA polymerase is a more recent addition to the improvements of the Sanger method. Innis et al., *Proc. Natl. Acad. Sci. U.S.A.* 85:9436 (1988). Taq polymerase is a thermostable enzyme which works efficiently at 70–75° C. The ability to catalyze DNA synthesis at elevated temperature makes Taq polymerase useful for sequencing templates which have extensive secondary structures at 37° C. (the standard temperature used for Klenow and Sequenase™ reactions). Taq polymerase, like Sequenase™, has a high degree of processivity and like Sequenase 2.0, it lacks 3' to 5' nuclease activity.

Methods were also developed for examining single base changes without direct sequencing. These methods allow for the "scanning" of DNA fragments for the presence of mutations or other sequence variation. For example, if a mutation of interest happens to fall within a restriction recognition sequence, a change in the pattern of digestion can be used as a diagnostic tool (e.g., restriction fragment length polymorphism [RFLP] analysis).

With the development of these complex and powerful biological techniques, an ambitious project has been undertaken. This project, called the Human Genome Project (HGP), involves the complete characterization of the archetypal human genome sequence which comprises $3 \times 10^9$ DNA nucleotide base pairs. An implicit goal of the project is the recognition that all humans are greater than 99% identical at the DNA sequence level. The differences between people, however, provide the information most relevant to individual health care, including potential estimates of the risk of disease or the response to a specific medical treatment. Upon completion of the HGP, a continuing effort of the human genetics research community will be the examination of differences within populations and of individual variants from the defined archetype. While the 15-year effort of the HGP represents a defined quantity of DNA data acquisition, the future demand for DNA information is tied to individual genetic variation and is, therefore, unlimited.

Current DNA genotyping technologies are adequate for the detailed analysis of samples that range in number from hundreds to thousands per year. Genotyping projects on the order of millions of assays, however, are beyond the capabilities of today's laboratories because of the current inefficiencies in (i) liquid handling of reagent and DNA template solutions, (ii) measurement of solution volumes, (iii) mixing of reagent and template, (iv) controlled thermal reaction of the mixed solutions, (v) sample loading onto an electrophoresis gel, and (vi) DNA product detection on size-separating gels. What is needed is methodology that allows for a high-volume of Li biological reactions without these existing inefficiencies.

SUMMARY OF THE INVENTION

The present invention relates to movement of microdroplets through microchannels, and more particularly, compositions, devices and methods to control microdroplet size and movement. The present invention involves microfabrication of microscale devices and reactions in microscale devices, and in particular, movement of biological samples in microdroplets through microchannels to, for example, initiate biological reactions.

The present invention contemplates microscale devices, comprising microdroplet transport channels having hydrophilic and hydrophobic regions, reaction chambers, gas-intake pathways and vents, electrophoresis modules, and detectors, including but not limited to radiation detectors. In some embodiments, the devices further comprise air chambers to internally generate air pressure to split and move microdroplets (i.e. "on-chip" pressure generation).

In a preferred embodiment, these elements are microfabricated from silicon and glass substrates. The various components are linked (i.e., in liquid communication) using flow-directing means, including but not limited to, a flow directing means comprising a surface-tension-gradient mechanism in which discrete droplets are differentially heated and propelled through etched channels. Electronic components are fabricated on the same substrate material, allowing sensors and controlling circuitry to be incorporated in the same device. Since all of the components are made using conventional photolithographic techniques, multi-component devices can be readily assembled into complex, integrated systems.

It is not intended that the present invention be limited by the nature of the reactions carried out in the microscale device. Reactions include, but are not limited to, chemical and biological reactions. Biological reactions include, but are not limited to sequencing, restriction enzyme digests, RFLP, nucleic acid amplification, and gel electrophoresis. It is also not intended that the invention be limited by the particular purpose for carrying out the biological reactions. In one medical diagnostic application, it may be desirable to differentiate between a heterozygotic and homozygotic target and, in the latter case, specifying which homozygote is present. Where a given genetic locus might code for allele A or allele a, the assay allows for the differentiation of an AA from an Aa from an aa pair of alleles. In another medical diagnostic application, it may be desirable to simply detect the presence or absence of specific allelic variants of pathogens in a clinical sample. For example, different species or subspecies of bacteria may have different susceptibilities to antibiotics; rapid identification of the specific species or subspecies present aids diagnosis and allows initiation of appropriate treatment.

The present invention contemplates a method for moving microdroplets, comprising: (a) providing a liquid microdroplet disposed within a microdroplet transport channel etched in silicon, said channel in liquid communication with a reaction region via said transport channel and separated from a microdroplet flow-directing means by a liquid barrier; and (b) conveying said microdroplet in said transport channel to said reaction region via said microdroplet flow-directing means. It is intended that the present invention be limited by the particular nature of the microdroplet flow-directing means. In one embodiment, it comprises a series of aluminum heating elements arrayed along said transport channel and the microdroplets are conveyed by differential heating of the microdroplet by the heating elements.

It has been found empirically that the methods and devices of the present invention can be used with success when, prior to the conveying described above the transport channel (or channels) is treated with a hydrophilicity-enhancing compound. It is not intended that the invention be limited by exactly when the treatment takes place. Indeed, there is some flexibility because of the long-life characteristics of some enhancing compounds.

It has also been found empirically that the methods and devices of the present invention can be used with success when regions of the microchannel are treated with hydrophobic reagents to create hydrophobic regions. By using defined, hydrophobic regions at definite locations in microchannels and using a pressure source, one can split off precise nanoliter volume liquid drops (i.e. microdroplets) and control the motion of those drops though the microchannels.

In one embodiment employing such hydrophobic regions (or "hydrophobic patches"), the present invention contemplates a method for moving microdroplets, comprising: (a)

providing microdroplet transport channel (or a device comprising a microdroplet transport channel), said channel i) having one or more hydrophobic regions and ii) in communication with a gas source; (b) introducing liquid into said channel under conditions such that said liquid stops at one of said hydrophobic regions so as to define i) a source of liquid microdroplets disposed within said channel and ii) a liquid-abutting hydrophobic region; and (c) separating a discrete amount of liquid from said source of liquid microdroplets using gas from said gas source under conditions such that a microdroplet of defined size i) comes in contact with, and ii) moves over, said liquid-abutting hydrophobic region.

In one embodiment, said gas from said gas source enters said channel from a gas-intake pathway in communication with said microdroplet transport channel and exits said channel from a gas vent that is also in communication with said microdroplet transport channel. It is preferred, in this embodiment, that the introduction of liquid into the channel (as set forth in part b of the above-described method) is such that i) the liquid passes over the gas-intake pathway and ii) the desired size of the microdroplet is defined by the distance between the gas-intake pathway and the liquid-abutting hydrophobic region. In this embodiment, introduction of the gas (as set forth in part c of the above-described method) forces the microdroplet to i) pass over the liquid-abutting hydrophobic region and ii) pass by (but not enter) the gas vent.

In another embodiment employing such hydrophobic regions (or "hydrophobic patches"), the present invention contemplates a method for moving microdroplets, comprising: (a) providing a device comprising a microdroplet transport channel etched in silicon, said channel i) having one or more hydrophobic regions and ii) in communication with a gas source; (b) introducing liquid into said channel under conditions such that said liquid stops at one of said hydrophobic regions so as to define i) a source of liquid microdroplets disposed within said channel and ii) a liquid abutting hydrophobic region; and (c) separating a discrete amount of liquid from said source of liquid microdroplets using gas from said gas source under conditions such that a microdroplet of defined size i) comes in contact with, and ii) moves over, said liquid-abutting hydrophobic region.

Again, it has been found empirically that there is a need for a liquid barrier between the liquid in the channels and the electronics of the silicon chip. A preferred barrier comprises a first silicon oxide layer, a silicon nitride layer, and a second silicon oxide layer.

The present invention further contemplates a method for merging microdroplets comprising: (a) providing first and second liquid microdroplets, a liquid microdroplet delivering means, and a device, said device comprising: i) a housing comprised of silicon, ii) first and second microdroplet transport channels etched in said silicon and connecting to form a third transport channel containing a reaction region, iii) a microdroplet receiving means in liquid communication with said reaction region via said transport channels, and iv) microdroplet flow-directing means arrayed along said first, second and third transport channels; (b) delivering said first liquid microdroplet via said microdroplet delivering means to said first transport channel; (c) delivering said second liquid microdroplet via said microdroplet delivering means to said second transport channel; and (d) conveying said microdroplets in said transport channels to said reaction region in said third transport channel via said microdroplet flow-directing means, thereby merging said first and second microdroplets to create a merged microdroplet.

In one embodiment, said first microdroplet comprises nucleic acid and said second microdroplet comprises a nuclease capable of acting on said nucleic acid. In this embodiment, it is desirable to enhance the mixing within the merged microdroplet. This can be achieved a number of ways. In one embodiment for mixing, after the conveying of step (d), the flow direction is reversed. It is not intended that the present invention be limited by the nature or number of reversals. If the flow direction of said merged microdroplet is reversed even a single time, this process increases the mixing of the reactants.

The present invention contemplates a variety of silicon-based, microdroplet transport channel-containing devices. In one embodiment, the device comprises: i) a housing comprised of silicon, ii) a microdroplet transport channel etched in said silicon, iii) a microdroplet receiving means in liquid communication with a reaction region via said transport channels, and iv) a liquid barrier disposed between said transport channels and a microdroplet flow-directing means. In one embodiment, the device is assembled in two parts. First, the channels are etched in any number of configurations. Secondly, this piece is bonded with a silicon-based chip containing the electronics. This allows for both customization (in the first piece) and standardization (in the second piece).

The present invention also contemplates devices and methods for the sealing of channels with meltable material. In one embodiment, the device comprises a meltable material disposed within a substrate and associated with a heating element.

In one embodiment, the present invention contemplates a method comprising: a) providing a device having a meltable material disposed within a substrate and associated with a heating element; and b) heating said meltable material with said heating element such that said meltable material at least partially liquifies and such that said substrate is not damaged. The method may further comprise c) allowing said liquified meltable material to cool. While the present invention is not limited by the size of the channel, in one embodiment said substrate further comprises a microdroplet channel disposed in said substrate, said meltable material is disposed within said microdroplet channel.

In another embodiment, the present invention contemplates a method for restricting fluid flow in a channel comprising a) providing a device comprising: i) a meltable material disposed within a substrate, said meltable material associated with a heating element; and ii) a diaphragm positioned such that, when extended, it touches said meltable material; b) extending said diaphragm such that it touches said meltable material; and c) heating said meltable material with said heating element such that said meltable material at least partially liquifies and such that said substrate is not damaged. In one embodiment the method further comprises d) allowing said meltable material to cool. While the present invention is not limited by the size of the channel, in one embodiment, the substrate further comprises a microdroplet channel disposed in said substrate, said meltable material disposed within said microdroplet channel.

The present invention also contemplates a method for restricting fluid flow in a channel, comprising: a) providing: i) a main channel connected to a side channel and disposed within a substrate, ii) meltable material disposed within said side channel and associated with a heating element, and iii) a movement means connected to said side channel such that application of said movement means induces said meltable material to flow from said side channel into said main channel; b) heating said meltable material such that said meltable material at least partially liquifies; and c) applying said movement means such that said liquified meltable material flows from said side channel into said main channel. While the present invention is not limited by the movement means, in one embodiment the movement means is forced air. In one embodiment the method further comprises d) allowing said meltable material to cool. While the present invention is not limited by the size of the charnel, in one embodiment, the main channel and the side channel are microdroplet channels.

While the present invention is not limited by the nature of the substrate, in one embodiment the substrate comprises silicon or glass. Likewise, the present invention is not limited by the composition of the meltable material. In one embodiment, the meltable material comprises solder. In a preferred embodiment, the solder comprises 40:60 Sn:Pb. In other embodiments, the meltable material is selected from a group consisting of plastic, polymer and wax. Likewise, the present invention is not limited by the placement of the meltable material in the substrate. In another embodiment, the meltable material is placed adjacent to a channel, while in another embodiment it is placed near the junction of more than one channel.

Definitions

The following definitions are provided for the terms used herein:

"Biological reactions" means reactions involving biomolecules such as enzymes (e.g., polymerases, nucleases, etc.) and nucleic acids (both RNA and DNA).Biological samples are those containing biomolecules, such proteins, lipids, nucleic acids. The sample may be from a microorganism (e.g., bacterial culture) or from an animal, including humans (e.g. blood, urine, etc.). Alternatively, the sample may have been subject to purification (e.g. extraction) or other treatment. Biological reactions require some degree of biocompatability with the device. That is to say, the reactions ideally should not be substantially inhibited by the characteristics or nature of the device components.

"Chemical reactions" means reactions involving chemical reactants, such as inorganic compounds.

"Channels" are pathways (whether straight, curved, single, multiple, in a network, etc.) through a medium (e.g., silicon) that allow for movement of liquids and gasses. Channels thus can connect other components, i.e., keep components "in communication" and more particularly, "in fluidic communication" and still more particularly, "in liquid communication." Such components include, but are not limited to, gas-intake channels and gas vents.

"Microdroplet transport channels" are channels configured (in microns) so as to accommodate "microdroplets." While it is not intended that the present invention be limited by precise dimensions of the channels or precise volumes for microdroplets, illustrative ranges for channels and microdroplets are as follows: the channels can be between 0.5 and 50 $\mu$m in depth (preferably between 5 and 20 $\mu$m) and between 20 and 1000 $\mu$m in width (preferably 500 $\mu$m), and the volume of the microdroplets can range (calculated from their lengths) between approximately 0.01 and 100 nanoliters (more typically between ten and fifty).

"Conveying" means "causing to be moved through" as in the case where a microdroplet is conveyed through a transport channel to a particular point, such as a reaction region. Conveying can be accomplished via flow-directing means.

"Flow-directing means" is any means by which movement of liquid (e.g. a microdroplet) in a particular direction is achieved. A variety of flow-directing means are contemplated, including but not limited to pumps such as a "bubble pump" described below. A preferred directing means employs a surface-tension-gradient mechanism in which discrete droplets are differentially heated and propelled through etched channels. For continuous flow of liquids, pumps (both external and internal) are contemplated.

A "bubble pump" is one embodiment of a flow-directing means, liquid is introduced into a channel, said channel comprising one or more electrodes positioned such that they will be in contact with a liquid sample placed in said channel. Two electrodes can be employed and a potential can be applied between the two electrodes. At both ends of the electrodes, hydrolysis takes place and a bubble is generated. The gas bubble continues to grow as the electrodes continue pumping electrical charges to the fluid. The expanded bubble creates a pressure differential between the two sides of the liquid drop which eventually is large enough to push the liquid forward and move it through the polymer channel.

When coupled with the capillary valve, a bubble pump can actuate a certain quantity of fluidic samples along the channel. The capillary valve is essentially a narrow section of a channel. In operation, the fluidic sample is first injected in the inlet reservoir. As soon as the fluid is loaded, it moves in the channel by capillary force. The fluid then passes the narrow section of the channel but stops at the edge where the channel widens again. After the fluidic sample is loaded, a potential is applied between two electrodes. At both ends of the electrodes, hydrolysis occurs and bubble is generated. The bubble keeps on growing as the electrodes continue pumping electrical charges to the fluid. The expanding bubble then creates a pressure differential between the two sides of the liquid drop, which eventually large enough to push the liquid forward.

The combination of bubble pump and capillary valve does not require any moving parts and is easy to fabricate. In addition, the device produces a well-controlled fluid motion, which depends on the bubble pressure. The bubble pressure is controlled by the amount of charges pumped by the electrodes. Furthermore, the power consumption of the device is minimal.

"Hydrophilicity-enhancing compounds" are those compounds or preparations that enhance the hydrophilicity of a component, such as the hydrophilicity of a transport channel. The definition is functional, rather than structural. For example, Rain-X™ anti-fog is a commercially available reagent containing glycols and siloxanes in ethyl alcohol. However, the fact that it renders a glass or silicon surface more hydrophilic is more important than the reagent's particular formula.

"Hydrophobic reagents" are used to make "hydrophobic coatings" in channels. It is not intended that the present invention be limited to particular hydrophobic reagents. In one embodiment, the present invention contemplates hydrophobic polymer molecules that can be grafted chmically to the silicon oxide surface. Such polymer molecules include, but are not limited to, polydimethylsiloxane. In another embodiment, the present invention contemplates the use of silanes to make hydrophobic coatings, including but not limited to halogenated silanes and alkylsilanes. In this regard, it is not intended that the present invention be limited to particular silanes; the selection of the silane is only limited in a functional sense, i.e. that it render the surface hydrophobic.

In one embodiment, n-octadecyltrichlorosilane (OTS) is used as a hydrophobic reagent. In another embodiment, octadecyldimethylchlorosilane is employed. In yet another embodiment, the present invention contemplates 1H,1H, 2H, 2H-perfluorodecyltricholorosilane (FDTS, $C_{10}H_4F_{17}SiCl_3$) as a hydrophobic reagent. In still other embodiments, fluoroalkyl-, aminoalkyl-, phenyl-, vinyl-, bis silyl ethane- and 3-methacryloxypropyltrimethoxysilane (MAOP) are contemplated as hydrophobic reagents. Such reagents (or mixtures thereof) are useful for making hydrophobic coatings, and more preferably, useful for making regions of a channel hydrophobic (as distinct from coating the entire channel).

It is not intended that the present invention be limited to particular dimensions for the hydrophobic regions of the present invention. While a variety of dimensions are possible, it is generally preferred that the regions have a width of between approximately 10 and 1000 $\mu$m (or greater if desired), and more preferably between approximately 100 and 500 $\mu$m.

A surface (such as a channel surface) is "hydrophobic" when it displays advancing contact angles for water greater than approximately seventy degrees. In one embodiment, the treated channel surfaces of the present invention display advancing contact angles for water between approximately ninety (90) and approximately one hundred and thirty (130) degrees. In another embodiment, the treated microchannels have regions displaying advancing contact angles for water greater than approximately one hundred and thirty (130) degrees.

A "liquid-abutting hydrophobic region" is a hydrophobic region within a channel which has caused liquid (e.g. aqueous liquid) to stop or be blocked from further movement down the channel, said stopping or blocking being due to the hydrophobicity of the region, said stopped or blocked liquid positioned immediately adjacent to said hydrophobic region.

"Initiating a reaction" means causing a reaction to take place. Reactions can be initiated by any means (e.g. heat, wavelengths of light, addition of a catalyst, etc.)

"Liquid barrier" or "moisture barrier" is any structure or treatment process on existing structures that prevents short circuits and/or damage to electronic elements (e.g., prevents the destruction of the aluminum heating elements). In one embodiment of the present invention, the liquid barrier comprises a first silicon oxide layer, a silicon nitride layer, and a second silicon oxide layer.

"Merging" is distinct from "mixing." When a first and second microdroplet is merged to create a merged microdroplet, the liquid may or may not be mixed. Moreover, the degree of mixing in a merged microdroplet can be enhanced by a variety of techniques contemplated by the present invention, including by not limited to reversing the flow direction of the merged microdroplet.

"Nucleic Acid Amplification" involves increasing the concentration of nucleic acid, and in particular, the concentration of a particular piece of nucleic acid. A preferred technique is known as the "polymerase chain reaction." Mullis et at., U.S. Pat. Nos. 4,683,195 and 4,683,202, hereby incorporated by reference, describe a method for increasing the concentration of a segment of target sequence in a mixture of genomic DNA without cloning or purification. This process for amplifying the target sequence consists of introducing a molar excess of two oligonucleotide primers to the DNA mixture containing the desired target sequence. The two primers are complementary to their respective strands of the double-stranded sequence. The mixture is denatured and then allowed to hybridize. Following hybridization, the primers are extended with polymerase so as to form complementary strands. The steps of denaturation, hybridization, and polymerase extension can be repeated as often as needed to obtain are relatively high concentration of a segment of the desired target sequence. The length of the segment of the desired target sequence is determined by the relative positions of the primers with respect to each other, and therefore, this length is a controllable parameter. By virtue of the repeating aspect of the process, the method is referred to by the inventors as the "Polymerase Chain Reaction" (hereinafter PCR). Because the desired segment of the target sequence become the dominant sequences (in terms of concentration) in the mixture, they are said to be "PCR-amplified."

"Substrate" as used herein refers to a material capable of containing channels and microdroplet transport channels. Examples include, but are not limited to, silicon and glass.

"Meltable material" as used herein refers to a material that is at least semi-solid (and preferably completely solid) at ambient temperature, will liquify when heated to temperatures above ambient temperature, and will at least partially resolidify when cooled. Preferably, meltable material at least partially liquifies at a temperature such that the substrate is undamaged. That is to say, at the temperature the meltable material liquifies, the substrate and other metals in the substrate does not liquify (readily tested as set forth in Example 6) and does not change its properties. By "changing properties" it is meant that the substrate or metal maintains it structural integrity, does not change its conductivity and does not liquify. Thus, the characteristic of being meltable is not necessarily associated with a particular melting point. Examples include, but are not limited to, solder, wax, polymer and plastic.

"Solder" as used herein refers to a metal or alloy that is a meltable material. Preferably, the solder is a lower temperature solder, such as set forth in U.S. Pat. No. 4,967,950, herein incorporated by reference. "Lower temperature solder" means a eutectic alloy. While the present invention is not limited to a specific solder, one preferred solder composition for the paste is a 63:37 eutectic alloy of tin:lead. Another compatible solder is a 90% metal composition having a 63:35:2 eutectic alloy of tin:lead:silver. Other desired solder compositions such as eutectic Pb:Sn, Pb:In, Pb:In:Sn etc.

"Heating element" as used herein refers to an element that is capable of at least partially liquify a meltable material. A meltable material is "associated with" a heating element when it is in proximity to the heating element such that the heating element can at least partially melt the meltable material. The proximity necessary will depend on the melting characteristics of the meltable material as well as the heating capacity of the heating element. The heating element may or may not be encompassed within the same substrate as the meltable material.

"Diaphragm" as used herein refers to an element capable of being manipulated such that it can at least partially block the passage of fluid in a channel in one position (extended) and permit the flow of fluid in a channel in another position. An "actuating force" is a force that is capable of extending a diaphragm. A "valve seat" is an element designed to accept a portion of the diaphragm when extended. A "movement means" is a means capable of moving liquified meltable material (e.g., force air, magnetic field, etc.).

A "source of liquid microdroplets" is a liquid source from which microdroplets can be made. Such sources include, but are not limited to, continuous streams of liquid as well as static sources (such as liquid in a reservoir). In a preferred embodiment, the source of liquid microdroplets comprises liquid in a microchannel from which microdroplets of a discrete size are split off.

DESCRIPTION OF THE DRAWINGS

FIG. 3B presents a schematic of one embodiment of the device wherein gas is introduced to split off a microdroplet.

DESCRIPTION OF THE INVENTION

Figure 1:
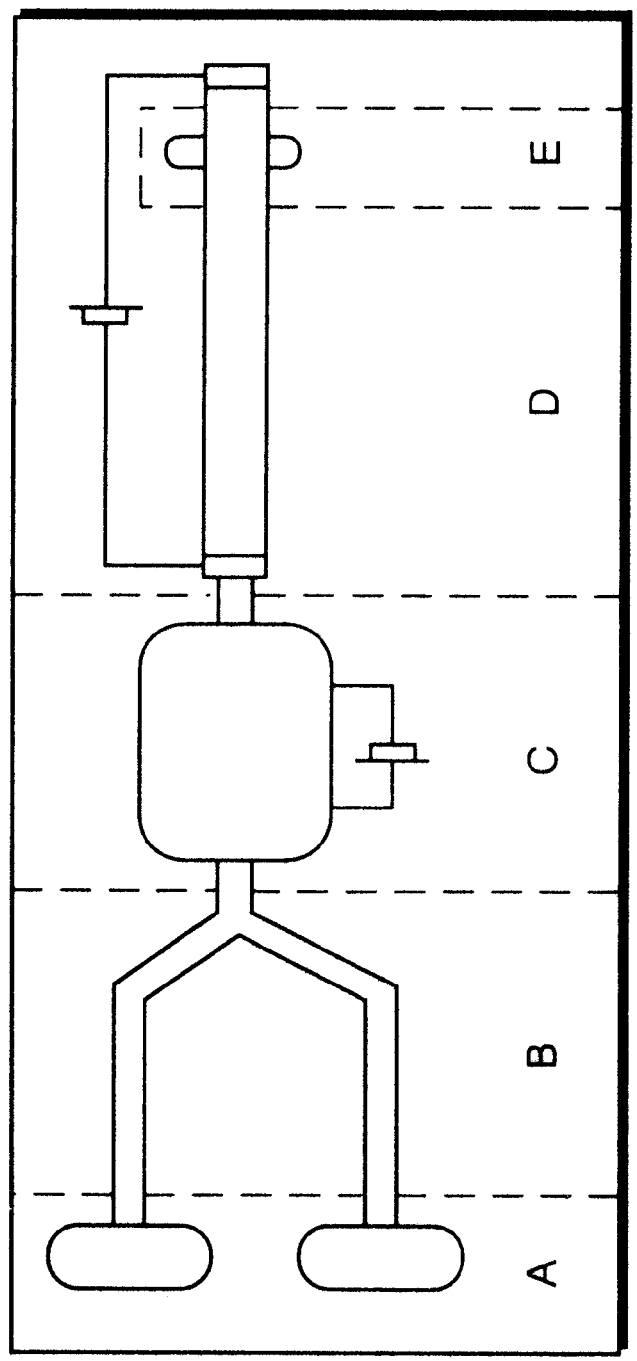
FIG. 1 is a schematic of an integrated analysis system of the present invention.

The present invention relates to microfabrication and biological reactions in microfabricated devices, and in particular, movement and mixing of biological samples in microdroplets through microchannels. The description of the invention involves I) the design of microscale devices (comprising microdroplet transport channels, reaction chambers, electrophoresis ports, and radiation detectors) using silicon and glass substrates, II) the creation (or definition) of microdroplets having a discrete size, III) movement of discrete micro droplets using a surface-tension-gradient mechanism in which discrete microdroplets are differentially heated and propelled through etched channels, IV) flow control with sealed valves, and V) mixing of biological samples for reactions.

I. Design Of MicroScale Devices

Although there are many formats, materials, and size scales for constructing integrated fluidic systems, the present invention contemplates silicon microfabricated devices as a cost-effective solution. Silicon is the material used for the construction of computing microprocessors and its fabrication technologies have developed at an unprecedented pace over the past 30 years. While this technology was initially applied to making microelectronic devices, the same techniques are currently being used for micromechanical systems.

Continuous flow liquid transport has been described using a microfluidic device developed with silicon. See J. Pfahler et al., Sensors and Actuators, A21–A23 (1990), pp. 431–434.

Pumps have also been described, using external forces to create flow, based on micromachining of silicon. See H. T. G. Van Lintel et al., Sensors and Actuators 15:153–167 (1988). By contrast, the present invention employs discrete droplet transport in silicon (i.e., in contrast to continuous flow) using internal forces (i.e., in contrast to the use of external forces created by pumps).

As a mechanical building material, silicon has well-known fabrication characteristics. The economic attraction of silicon devices is that their associated micromachining technologies are, essentially, photographic reproduction techniques. In these processes, transparent templates or masks containing opaque designs are used to photodefine objects on the surface of the silicon substrate. The patterns on the templates are generated with computer-aided design programs and can delineate structures with line-widths of less than one micron. Once a template is generated, it can be used almost indefinitely to produce identical replicate structures. Consequently, even extremely complex micromachines can be reproduced in mass quantities and at low incremental unit cost—provided that all of the components are compatible with the silicon micromachining process. While other substrates, such as glass or quartz, can use photolithographic methods to construct microfabricated analysis devices, only silicon gives the added advantage of allowing a large variety of electronic components to be fabricated within the same structure.

In one embodiment, the present invention contemplates silicon micromachined components in an integrated analysis system, including the elements identified schematically in FIG. 1. In this proposed format, sample and reagent are injected into the device through entry ports (A) and they are transported as discrete droplets through channels (B) to a reaction chamber, such as a thermally controlled reactor where mixing and reactions (e.g., restriction enzyme digestion or nucleic acid amplification) occur (C). The biochemical products are then moved by the same method to an electrophoresis module (D) where migration data is collected by a detector (E) and transmitted to a recording instrument (not shown). Importantly, the fluidic and electronic components are designed to be fully compatible in function and construction with the biological reactions and reagents.

In silicon micromachining, a simple technique to form closed channels involves etching an open trough on the surface of a substrate and then bonding a second, unetched substrate over the open channel. There are a wide variety of isotropic and anisotropic etch reagents, either liquid or gaseous, that can produce channels with well-defined side walls and uniform etch depths. Since the paths of the channels are defined by the photo-process mask, the complexity of channel patterns on the device is virtually unlimited. Controlled etching can also produce sample entry holes that pass completely through the substrate, resulting in entry ports on the outside surface of the device connected to channel structures.

Figure 2:
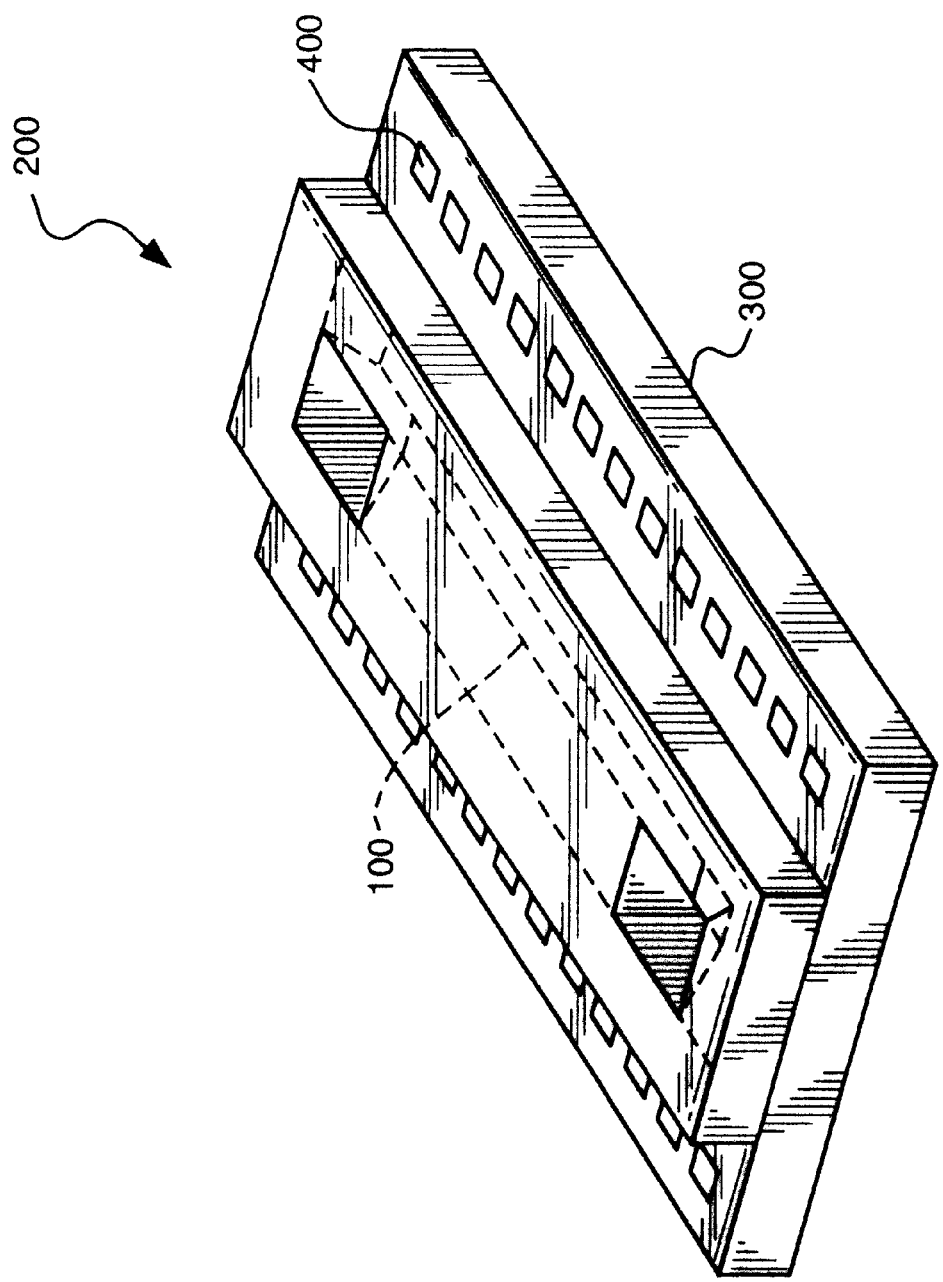
FIG. 2 shows a two-part approach to construction of a silicon device of the present invention.

FIG. 2 shows a two-part approach to construction. Microchannels (100) are made in the silicon substrate (200) and the structure is bonded to a glass substrate (300). The two-part channel construction technique requires alignment and bonding processes but is amenable to a variety of substrates and channel profiles. In other words, for manufacturing purposes, the two-part approach allows for customizing one piece (i.e., the silicon with channels and reaction formats) and bonding with a standardized (non-customized) second piece, e.g., containing standard electrical pads (400).

II. The Creation Of MicroDroplets

The present invention contemplates methods, compositions and devices for the creation of microdroplets of discrete (i.e. controlled and predetermined) size. The present invention contemplates the use of selective hydrophobic coatings to develop a liquid-sample injection and motion system that does not require the use of valves. In one embodiment, the present invention contemplates a method of lift-off to pattern hydrophobic and hydrophilic regions on glass, quartz and silicon substrates, involving i) the deposition of a hydrophobic reagent (such as a self-assembled monolayer film of OTS) on a silicon oxide surface pattered by a metal layer and ii) subsequent removal of the metal to give hydrophobic patterns. Other substrates such as plastics can also be used after depositing a think film of silicon oxide or spin-on-glass.

Previous work in patterning hydrophobic surfaces have been done by photocleaving of such monolayer films. The photocleaving procedure uses Deep-UV exposure to make the molecules of the monolayer hydrophilic. By contrast, the present invention contemplates a method which eliminates the use of high-power UV source; rather the preferred method of the present invention uses simple microfabrication procedures.

Following the proper hydrophobic patterning of the surface (e.g. the surface of a microdroplet transport channel), the present invention contemplates the placement of a patterned etched glass cap over the pattern on a flat surface. The hydrophobic/hydrophilic channels thus formed can then be used to move precise nanoliter-volume liquid samples.

Figure 3A:
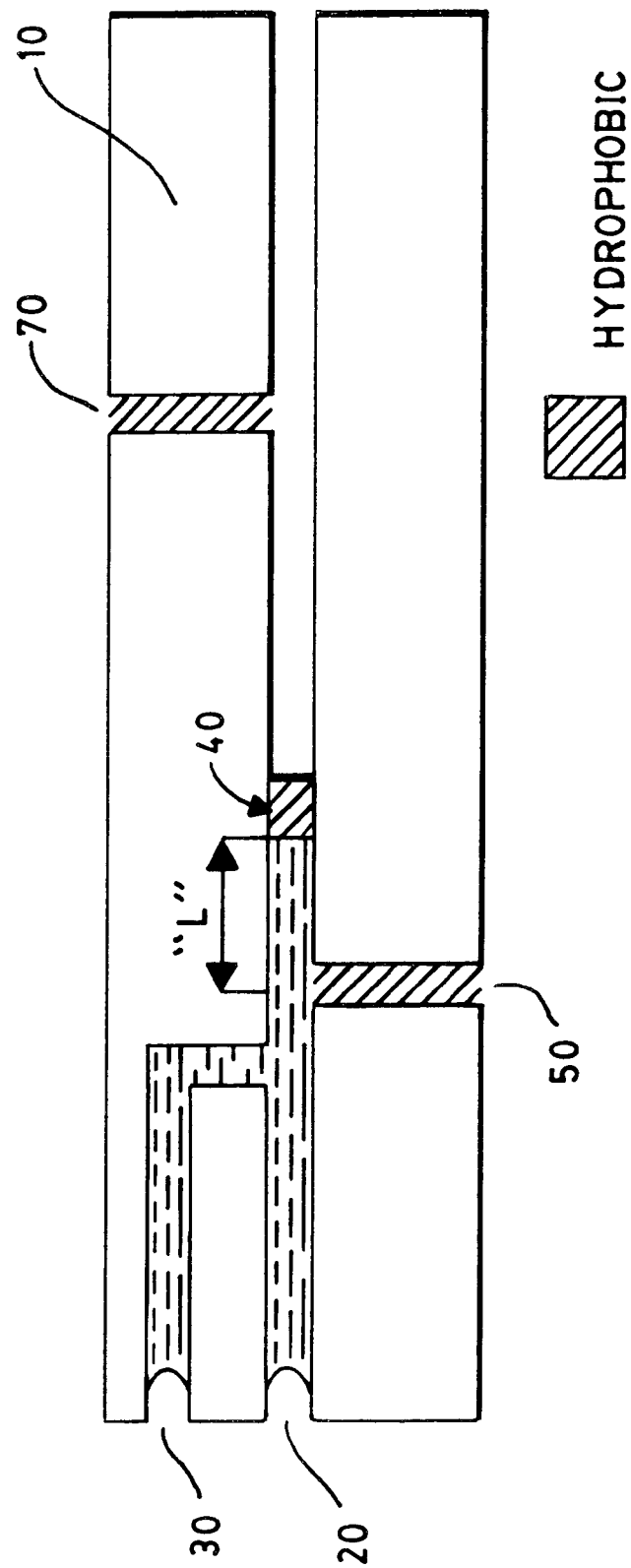
FIG. 3A presents a schematic of one embodiment of a device wherein the front of the liquid moves by (but does not enter) a gas-intake pathway (50) that is in fluidic communication with the channel.

FIGS. 3A and 3B show a schematic of one embodiment of a device to split a nonoliter-volume liquid sample and move it using external air, said device having a plurality of hydrophobic regions. Looking at FIG. 3A, liquid (shown as solid black) placed at the inlet (20) is drawn in by surface forces and stops in the channel at the liquid-abutting hydrophobic region (40), with overflow handled by an overflow channel and overflow outlet (30). In the embodiment shown in FIG. 3A, the front of the liquid moves by (but does not enter) a gas-intake pathway (50) that is in fluidic communication with the channel; the liquid-abutting hydrophobic region (40) causes the liquid to move to a definite location. Gas from a gas source (e.g. air from an external air source and/or pump) can then be injected (FIG. 3B, lower arrow) to split a microdroplet of length "L". The volume of the microdroplet split-off (60) is pre-determined and depends on the length "L" and the channel cross-section. To prevent the the pressure of the gas (e.g. air) from acting towards the inlet side, the inlet (20) and overflow ports (30) can be blocked or may be loaded with excess water to increase the resistance to flow.

The patterened surfaces can also be used to control the motion of the drop. By placing a hydrophobic gas vent (70) further down the channel, one can stop the liquid microdroplet (60) after moving beyond the vent (70). As the drop (60) passes the vent (70), the air will go out through the vent (70) and will not push the drop further.

One can start moving the drop (60) again by blocking the vent (70). By using a combination of hydrophobic air pressure lines (not shown), hydrophobic vents and strategic opening and/or closing of vents, one can move the liquid drop back and forth for mixing or move it to precise locations in a channel network to perform operations such as heating, reaction and/or separations.

In addition to using external air, one can also use internally generated air pressure to split and move drops. FIGS.

Figure 4A:
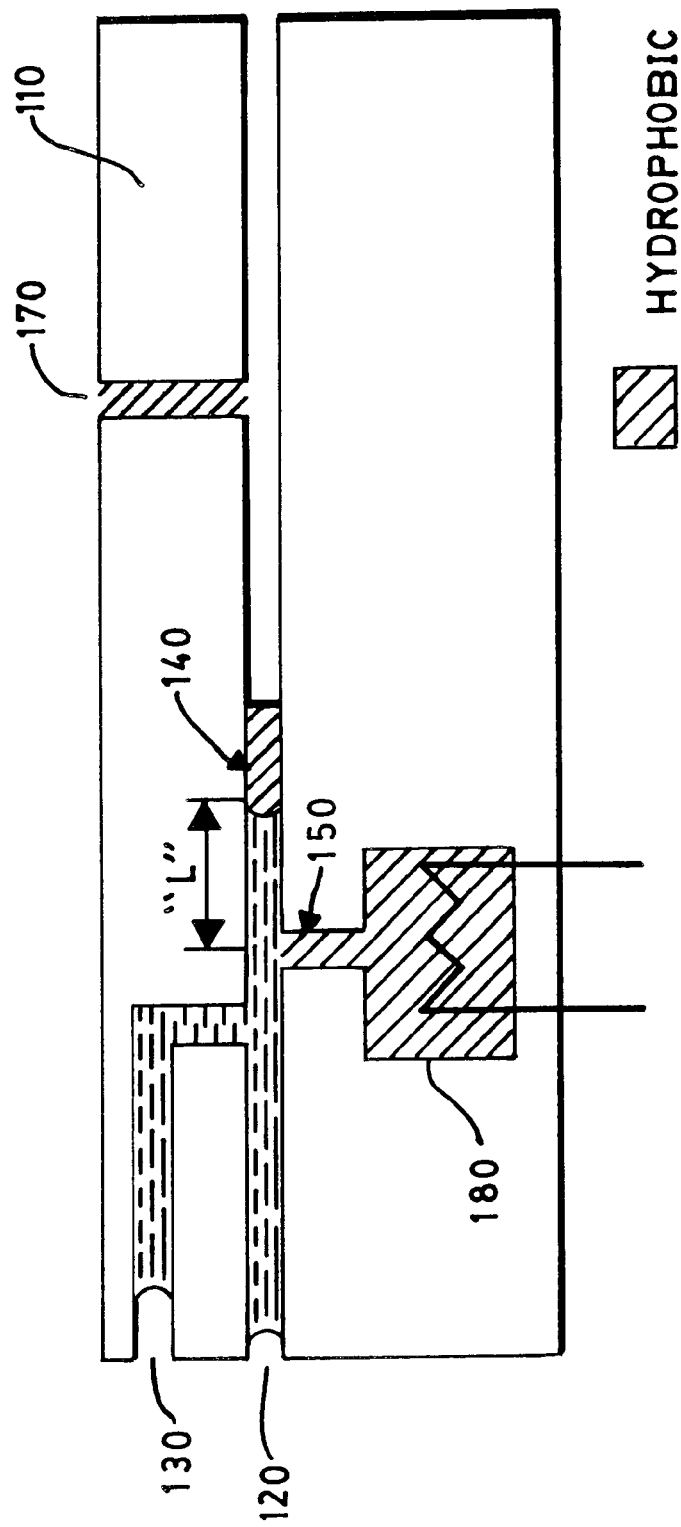
FIG. 4A shows a schematic of one embodiment of a device of the present invention to split, move and stop microdroplets using internal gas pressure generation.
Figure 4B:
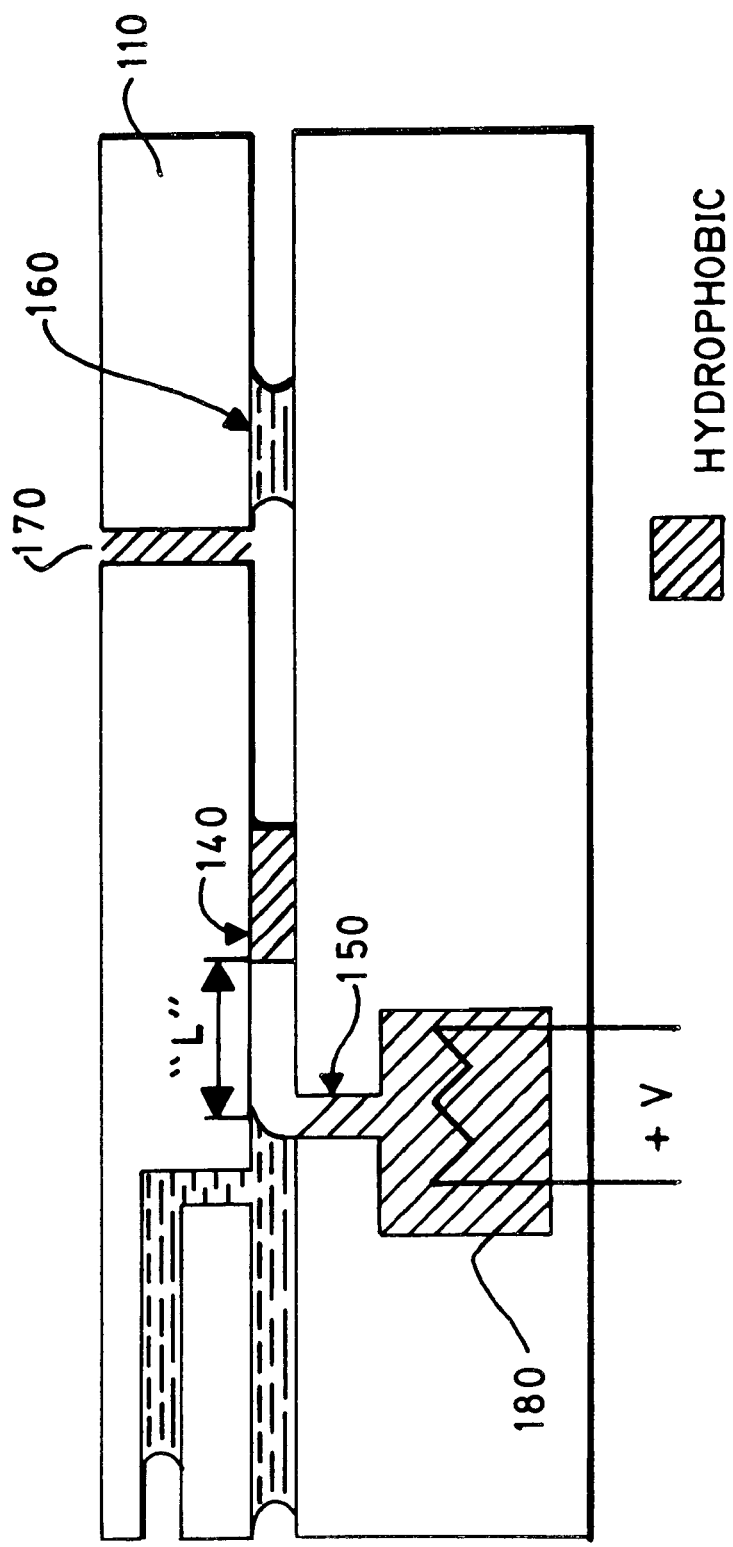
FIG. 4B shows a schematic of another embodiment of a device of the present invention to split, move and stop microdroplets using internal gas pressure generation.

4A and 4B present schematics of one embodiment of a device (10) of the present invention to split (e.g. define), move and stop microdroplets using internal gas (e.g. air) pressure generation, said device having a plurality of hydrophobic regions. Looking at FIG. 4A, liquid (shown as solid black) placed at the inlet (120) is drawn in by surface forces and stops in the channel at the liquid-abutting hydrophobic region (140), with overflow handled by an overflow channel and overflow outlet (130). In the embodiment shown in FIG. 4A, the front of the liquid moves by (but does not enter) a gas-intake pathway (150) that is in fluidic communication with the channel. By heating air trapped inside chambers (180) that are in fluidic communication with the microdroplet transport channel via the gas-intake pathway (150), an increased pressure can be generated. The magnitude of the pressure increase inside a chamber of volume V is related to the increase in temperature and can be estimated by the Ideal Gas relation:

Increasing the temperature of the gas (e.g. air) will cause the pressure inside the chamber to rise until the pressure is high enough to split off a drop (160) and move it beyond the liquid-abutting hydrophobic region (140). In order to avoid the problem of the expanded air heating up the liquid, the chamber may be placed at a distance from the transport channel. Moreover, having the heaters suspended inside the air chamber or placing them on a thin insulation membrane will not only avoid cross-talk, but will involve a minimal power consuption.

The compositions and methods are suitable for devices having a variety of designs and dimensions, including, but not limited to, devices with chamber volumes from 0.24 mm$^1$ to 0.8 mm$^3$ for channel dimensions of 40 $\mu$m by 500 $\mu$m. Drop splitting and motion is seen with 1–3 seconds using voltages between 4.5 volts to 7.5 volts (the resistance of the heaters varied between 9.5 ohms to 11 ohms). The size of the drop split is between approximately 25 and approximately 50 nanoliters, depending on the value "L" used for the channel design. Keeping the heaters actuated keeps the microdroplet moving almost to the end of the channel (a distance of around 12.5 mm); the time taken depends on the voltage applied to the heater and the volume of the chamber. Initiation of drop motion is seen sooner for the operation of devices with smaller chambers. While an understanding of precise mechanisms is not needed for the successful practice of the present invention, it is believed that with smaller chamber, the volume is smaller and higher values of pressure are achieved more quickly. The maximum temperatures reached near the heater are approximately 70° C. measured by the RTD.

III. Movement Of Discrete MicroDroplets

Figure 5:
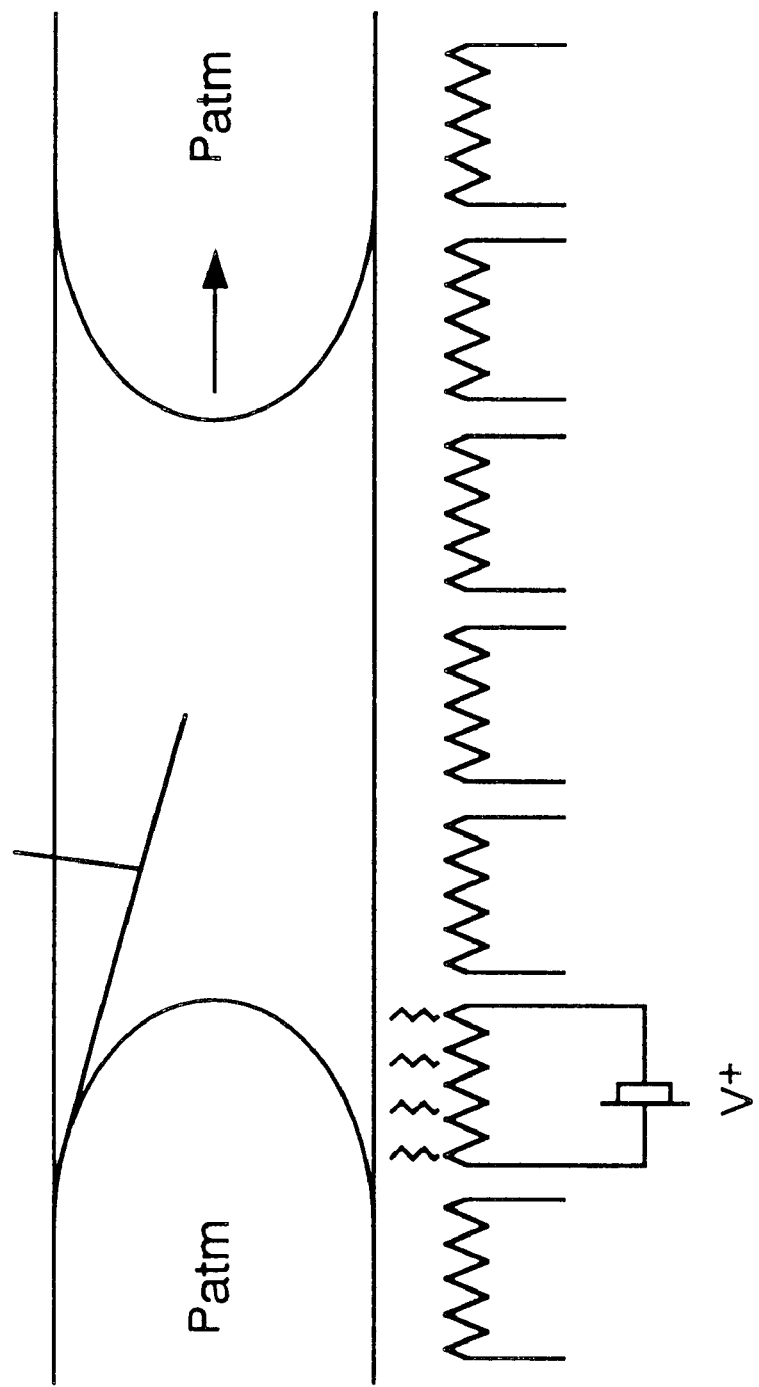
FIG. 5 is a schematic showing the principle of thermally-induced liquid microdroplet motion in a closed channel.

The present invention describes the controlled movement of liquid samples in discrete droplets in silicon. Discrete droplet transport involves a system using enclosed channels or tubes to transport the liquid to the desired locations (FIG. 1, B). Within the channels, discrete liquid reagent microdroplets can be injected, measured, and moved between the biochemical analysis components. Discrete droplet movement has three advantages. First, each sample droplet is separated from all others so that the risk of contamination is reduced. Second, in a uniform channel, the volume of each sample can be determined by merely measuring the droplet length. Third, the motion of these droplets can be accomplished with simple heating (i.e., using internal forces and no moving parts). Movement is performed using thermal gradients to change the interfacial tension at the front or back of the droplets and, thus, generate pressure differences across the droplet (FIG. 5). For example, a droplet in a hydrophilic channel can be propelled forward by heating the back interface. The local increase in temperature reduces the surface tension on the back surface of the droplet and, therefore, decreases the interfacial pressure difference. The decreased pressure difference corresponds to an increase in the local internal pressure on that end of the droplet ($P_1$ increases). The two droplet interfaces are no longer in equilibrium, with $P_1$ greater than $P_2$, and the pressure difference propels the droplet forward.

That is to say, forward motion can be maintained by continuing to heat the droplet at the rear surface with successive heaters along the channel, while heating the front surface can be used to reverse the motion of the droplet. Applying a voltage to the wire beneath the channel generates heat under the edge of the droplet. Heating the left interface increases the internal pressure on that end of the droplet and forces the entire droplet to the right. The pressure on the interior of the droplet can be calculated knowing the atmospheric pressure, $P_{atmp}$, the surface tension, $\sigma$, and the dimensions of the channel. For a circular cross-section, the interior pressure, $P_i$, is given by $P_i=P_{atm}-(4\sigma \cos \theta)/d$ where d is the diameter of the channel and $\theta$ is the contact angle. Since $\sigma$ is a function of temperature ($\sigma=\sigma_n(1-bT)$ where $\sigma_o$ and b are positive constants and T is the temperature), increasing the temperature on the left end of the droplet decreases the surface tension and, therefore, increases the internal pressure on that end. The pressure difference between the two ends then pushes the droplet towards the direction of lower pressure (i.e., towards the right). The aqueous droplet shown is in a hydrophilic channel (0<$\theta$<90); for a hydrophobic channel (90<$\theta$<180), heating the right edge would make the droplet move to the right.

Contact angle hysteresis (the contact angle on the advancing edge of the droplet is larger than the contact angle on the retreating edge) requires a minimum temperature difference before movement will occur. The velocity of the droplet after motion begins can be approximated using the equation v=AEPd$^2$/32 $\mu$L where AEP is the pressure difference, $\mu$ is the viscosity of the solution, and L is the length of the droplet. The present invention contemplates temperature differences of greater than thirty (30) degrees Centigrade to create movement. Experiments using temperature sensors arrayed along the entire channel indicate that a differential of approximately 40° C. across the droplet is sufficient to provide motion. In these experiments, the channel cross-section was 20 $\mu$m×500 $\mu$m, and the volume of each of these droplets can be calculated from their lengths and is approximately 100 nanoliters for a 1 cm long droplet.

IV. Flow Control with Sealed Valves

The present invention contemplates the use of sealed valves to control fluid flow. While the present invention is not limited to a particular sealing method, in one embodiment, an actuating force pushes a diaphragm against a valve seat to restrict fluid flow and the diaphragm is then sealed to the valve seat. In such an embodiment, the solder pads are associated with a heating element that can melt the solder. This liquified solder flows over areas of the valve seat and diaphragm to cover contamination, cracks and crooks between the diaphragm and valve seat. With the actuating force still holding the diaphragm and valve-seat together, the heating element is turned off to allow the solder to cool and re-solidify. Upon solidification, the actuating force can be released and the valve is sealed. To open the valve again, the solder can be liquified without applying an actuation force.

In a preferred embodiment, the valve is designed such that solder pads are placed on the diaphragm or valve seat. While the present invention is not limited to a precise method of placing these solder pads, it is specifically contemplated that they can be electroplated.

V. Mixing Biological Samples In Reactions

Figure 6A:
FIG. 6A shows a selected frame of a videotape wherein two microdroplets are at their starting locations in the branches of the Y-channel.
Figure 6B:
FIG. 6B shows movement by heating the left interface of both microdroplets.
Figure 6C:
FIG. 6C shows the microdroplets at the intersection.

Droplet motion (described generally above) is contemplated as one step in a pathway. The other steps typically involve sample mixing and a controlled reaction. For example, the integral heaters arrayed along the entire surface of the channel used for droplet motion also allow for a region of a channel to be used as a thermal reaction chamber. For sample mixing prior to the reaction, a Y-channel device is contemplated (FIG. 6A). In such a device, a first droplet containing a first sample (e.g., nucleic acid) is moved along one channel of the Y-channel device, and a second droplet containing a second sample (e.g., a restriction digest enzyme in digestion buffer) is moved along the other channel of the Y-channel device (FIGS. 6B and 6C)

Following sample merging (FIG. 6D), there is the concern that the combined samples have not been properly mixed. That is to say, if two similar microdroplets enter the single channel in laminar flow at the same flow rate, they will form an axially uniform droplet but will not be mixed width-wise. Width-mixing can be accomplished in a number of ways.

First, there is simple diffusion, although, for large DNA molecules, the characteristic time for this mixing could be on the order of several hours or more. Circulation patterns generated inside the droplets during movement and heating significantly reduce this time. In this regard, the present invention contemplates maintaining the mixture as a heated mixture (e.g., maintaining the temperature at 65° C. for 10 minutes) using the integral heaters and temperature sensors.

Second, the present invention contemplates mixing by reversing the flow direction of the mixture over a relatively short distance in the channel. While a variety of reverse flow approaches are possible, one or two direction changes over a distance comprising approximately two droplet lengths has been found to be adequate.

Finally, there is the mixing approach wherein the mixture is moved against or over physical obstacles. For example, the mixture can be either "crashed" back against merge point of the Y-channel or simply moved over deliberate imperfections in the channel (i.e., "roller coaster" mixing).

Successful mixing, of course, can be confirmed by characterization of the product(s) from the reaction. Where product is detected, mixing has been at least partially successful. The present invention contemplates, in one embodiment, using electrophoresis to confirm product formation.

DESCRIPTION OF PREFERRED EMBODIMENTS

The description of the preferred embodiments involves: I) microfabrication techniques for manufacture of silicon-based devices; II) channel treatment for optimum flow and reproducibility; III) channel treatment for fabricating hydrophobic regions, and IV) component design (particularly the electrophoresis module and the radiation detectors).

I. Microfabrication Of Silicon-Based Devices

As noted previously, silicon has well-known fabrication characteristics and associated photographic reproduction techniques. The principal modern method for fabricating semiconductor integrated circuits is the so-called planar process. The planar process relies on the unique characteristics of silicon and comprises a complex sequence of manufacturing steps involving deposition, oxidation, photolithography, diffusion and/or ion implantation, and metallization, to fabricate a "layered" integrated circuit device in a silicon substrate. See e.g., W. Miller, U.S. Pat. No. 5,091,328, hereby incorporated by reference.

For example, oxidation of a crystalline silicon substrate results in the formation of a layer of silicon dioxide on the substrate surface. Photolithography can then be used to selectively pattern and etch the silicon dioxide layer to expose a portion of the underlying substrate. These openings in the silicon dioxide layer allow for the introduction ("doping") of ions ("dopant") into defined areas of the underlying silicon. The silicon dioxide acts as a mask; that is, doping only occurs where there are openings. Careful control of the doping process and of the type of dopant allows for the creation of localized areas of different electrical resistivity in the silicon. The particular placement of acceptor ion-doped (positive free hole, "p") regions and donor ion-doped (negative free electron, "n") regions in large part defines the interrelated design of the transistors, resistors, capacitors and other circuit elements on the silicon wafer. Electrical interconnection and contact to the various p or n regions that make up the integrated circuit is made by a deposition of a thin film of conductive material, usually aluminum or polysilicon, thereby finalizing the design of the integrated circuit.

Of course, the particular fabrication process and sequence used will depend on the desired characteristics of the device. Today, one can choose from among a wide variety of devices and circuits to implement a desired digital or analog logic feature.

In a preferred embodiment, channels were prepared on 500 $\mu$m thick glass wafers (Dow Corning 7740) using standard aqueous-based etch procedures. The initial glass surface was cleaned and received two layers of electron beam evaporated metal (20 nm chromium followed by 50 nm gold). Photoresist Microposit 1813 (Shipley Co.) was applied 4000 rpm, 30 seconds; patterned using glass mask 1 and developed. The metal layers were etched in chromium etchant (Cr-14, Cyantek Inc.) and gold etchant (Gold Etchant TFA, Transene Co.) until the pattern was clearly visible on the glass surface. The accessible glass was then etched in a solution of hydrofluoric acid and water (1:1, v/v). Etch rates were estimated using test wafers, with the final etch typically giving channel depths of 20 to 30 $\mu$m. For each wafer, the depth of the finished channel was determined using a surface profilometer. The final stripping (PRS-2000, J. T. Baker) removed both the remaining photoresist material and the overlying metal.

In one embodiment, channels etched on glass in the above-described manner, were bonded to the heater-element wafer in a two-part construction approach using optical adhesive (SK-9 Lens Bond, Sumers Laboratories, Fort Washington, Pa.). The bond was cured under an ultraviolet light source (365 nm) for 12 to 24 hours.

Figure 7A:
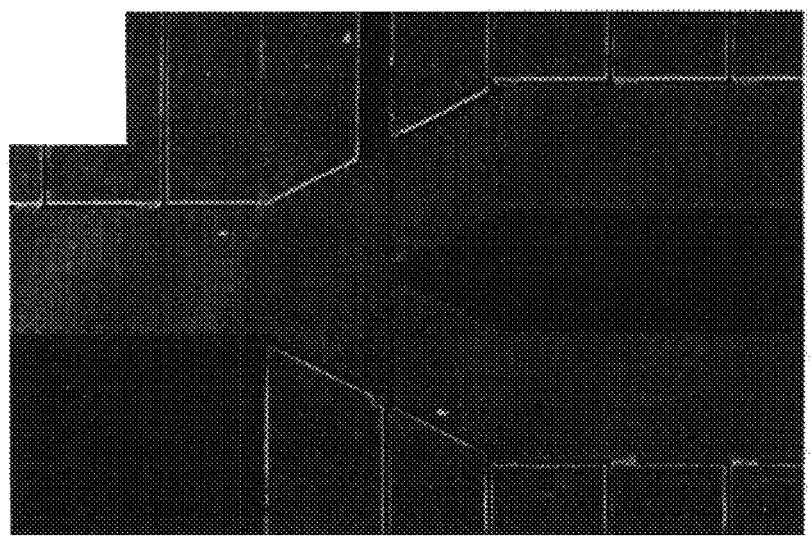
FIG. 7A is a photomicrograph of inlay-process heater elements on the surface of a silicon wafer.
Figure 7B:
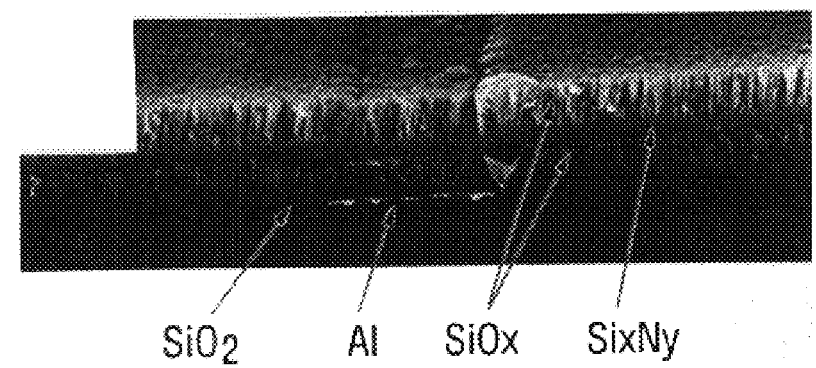
FIG. 7B is a scanning electron micrograph (SEM) of an inlay-process heater wire in cross section (the arrows indicate the deposited aluminum, silicon dioxide, and silicon nitride layers).

Initial device design by the present inventors involved single layers of silicon. However, experience showed these to be inadequate to prevent short circuiting due to (necessary) liquid microdroplets within the channels (see experiments described below). The preferred design involves a triple layer of oxides. Such a preferred device capable of moving and mixing nanoliter droplets was constructed by bonding a planar silicon substrate to channels etched in a glass cover. A series of metal heaters was inlaid on the silicon substrate as two parallel lanes merging into a single lane (a "Y"-shape) (FIG. 7A). The heating elements were formed by first coating the wafer with a 1.0 $\mu$m layer of thermal silicon dioxide Next, 0.35 μm deep, 5 μm wide grooves were reactive-ion etched (RIE) into the silicon dioxide following the pattern set in an overlying photoresist. Aluminum was deposited (0.35 μm) across the entire wafer using electron beam evaporation and the metal layer was "lifted-off" from all surfaces having intact photoresist using a stripping solution. The metal inlay process gives a relatively planar surface and provides a uniform base for deposition of a solution-impermeable barrier layer. The barrier layer is made by a sequence of three plasma-enhanced chemical vapor depositions (PECVD): 1.0 μm silicon oxide ($SiO_x$), 0.25 μm silicon nitride ($Si_xN_y$), and 1.0 μm silicon oxide ($SiO_x$) (FIG. 7B). Some heating elements were also used as resistive temperature sensors.

Heater elements were fabricated as follows. Silicon wafer (p-type, 18–22½-cm, <100>, boron concentration Å $10^{15}$ $cm^3$) was used as a substrate for growth of $SiO_2$ thermal oxide (1 μm); photoresist (AZ-5214-E, Hoescht-Celanese) was applied and spun at 3000 rpm, 30 seconds. The resist was patterned (metal 1) and developed. Reactive ion etch (RIE, PlasmaTherm, Inc.) was performed to 0.35 μm depth into the $SiO_2$ layer at the following conditions: $CHF_3$, 15 sccm (standard cubic centimeters per minute); $CF_4$, 15 sccm; 4 mTorr; DC bias voltage of 200V, 100 W, 20 minutes. The etch depth was measured by profilometer and 0.35 μm metallic aluminum was electron beam deposited. The resist and overlying metal was lifted off by development using Microposit 1112A remover in solution (Shipley Co.). The barrier layers consist of sequentially deposited 1 μm $SiO_x$, 0.25 μm $Si_xN_y$, and 1 μm SiOX using plasma-enhanced chemical vapor deposition (PECVD). RIE was used to etch contact holes to the metal layer using a second mask ($CHF_3$, 15 sccm; $CF_4$, 15 sccm; 4 mTorr; and DC bias voltage of 200V, 100 W, 120 minutes).

Figure 7C:
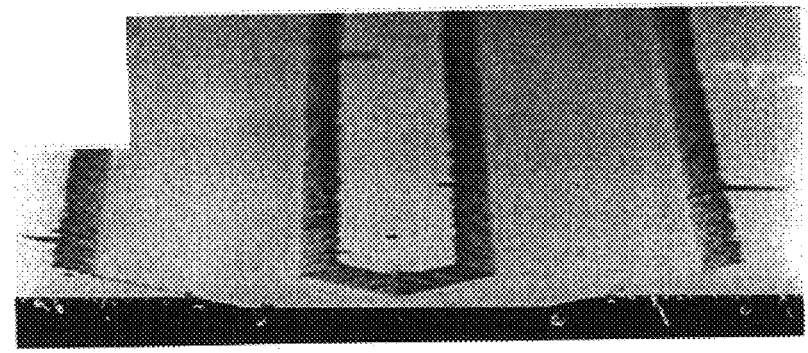
FIG. 7C is a SEM of a channel formed on glass using a wet-etch process, shown in cross section with the etched face of the wafer immediately adjacent to the intersection of two channels.

As shown in FIGS. 7A, 7B, and 7C the elements are arrayed as two parallel lanes, each 500 μm wide, merging into one lane. The individual heaters consist of paired aluminum wires (5 μm) winding across the 500 μm wide region. The broad metal areas on either side of the elements are bonding locations for connection to external circuitry. The width of the aluminum element is 5 μm. The channel in FIG. 7C has identical width and design configurations as the heating element lanes in FIG. 7A, and is uniformly etched 500 μm wide and approximately 20 μm deep.

The heating-element wafer was bonded to a glass wafer containing etched channels with the same "Y" format. An aqueous chemical etch of concentrated hydrofluoric acid was used to produce channels with defined side walls and uniform depth. The etched channels are defined by a chromium/gold mask and are 500 μm wide and approximately 20 μm deep. The complementary silicon heater and glass channel wafers were aligned and then bonded with adhesive to form the finished device.

Each heating element used as a temperature sensor is preferably first calibrated by measurement of electrical resistance at 22° C. and 65° C. under constant voltage; intermediate temperatures are estimated by linear interpolation.

II. Channel Treatment

Prior to performing microdroplet motion and biological reactions, the channels are preferably treated by washing with base, acid, buffer, water and a hydrophilicity-enhancing compound, followed by a relatively high concentration solution of non-specific protein. In a preferred embodiment, the channels are washed with approximately 100 μl each of the following solutions in series: 0.1N NaOH; 0.1N HCl; 10 mM Tris-HCl (pH 8.0), deionized $H_2O$, Rain-X Anti-Fog (a hydrophilicity-enhancing compound commercially available from Unelko Corp., Scottsdale, Ariz.), and 500 μg/μl bovine serum albumin (non-specific protein commercially available in restriction enzyme grade from GIBCO-BRL). The wafer was placed on a stereoscope stage (Olympus SZ1145), and the contact pads for the heating elements were connected to a regulated power supply. Heating occurred by passing approximately 30 volts through the element in short pulses and observing the movement rate of the droplets. A detectable reduction in droplet volume from evaporation was noted in each experiment, usually of less than 30%. Droplet movement was recorded with a Hamamatsu video camera on videotape.

III. Channel Treatment For Hydrophobic Regions

Figure 8A:
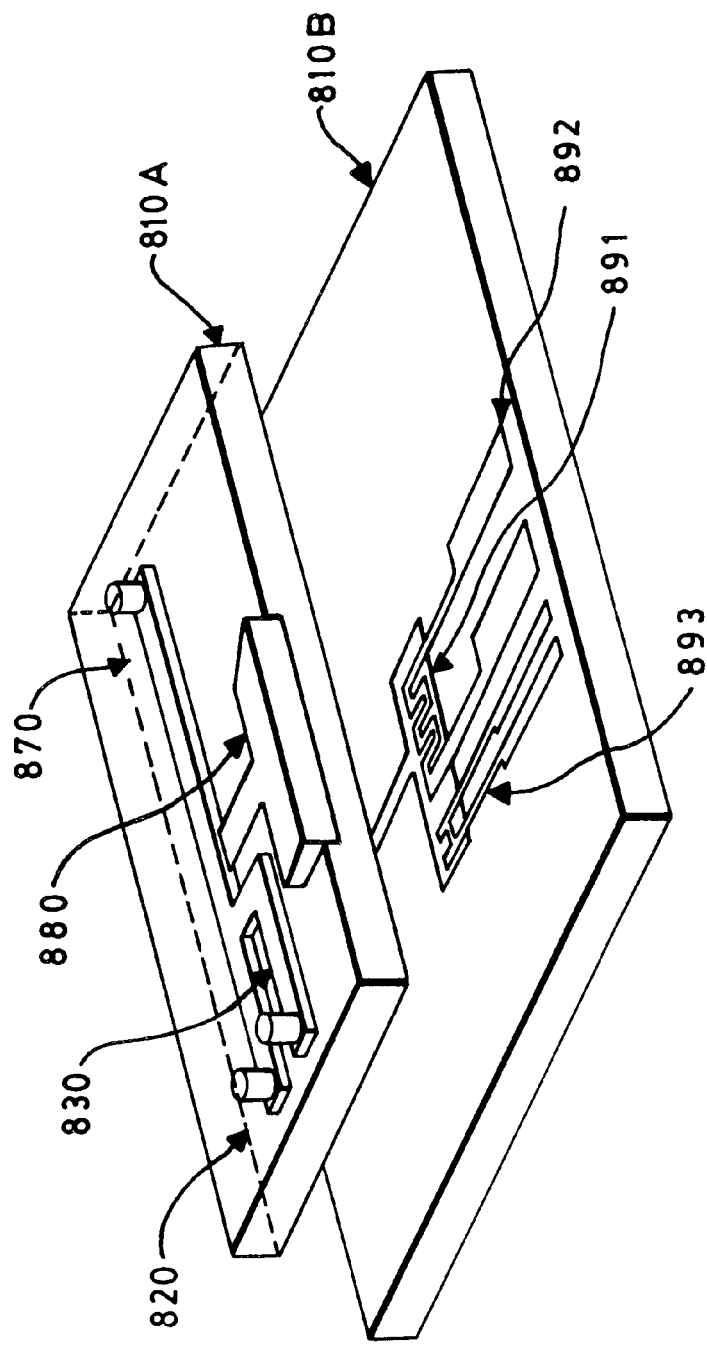
FIG. 8A is a schematic of one embodiment of the device of the present invention wherein the device comprises a glass top bonded to a silicon substrate.

In one embodiment of the device of the present invention (FIG. 8A), the device comprises a glass top (810A) bonded to a silicon substrate (810B) containing the heater (891), the contact pad (892) and the resisitive temperature detector (893). The glass side has channels and chambers etched into it. FIG. 8A shows the inlet (820) and overflow (830) ports, a gas vent (870) and a air chamber (880).

Heaters and Resisitive Temperature Detectors

Figure 8B:
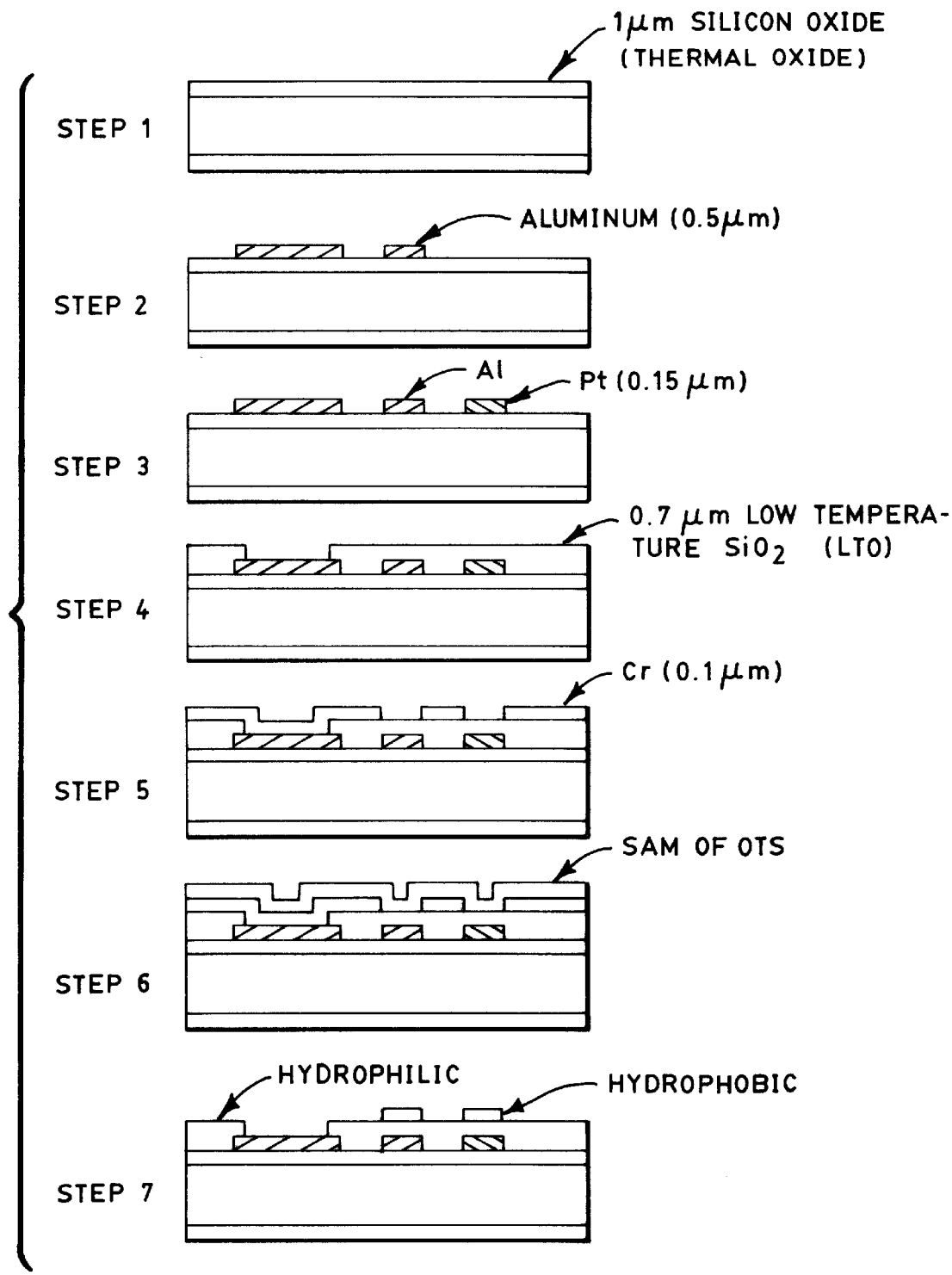
FIG. 8B is a schematic showing one embodiment of the fabrication steps for fabrication of components in silicon.

The fabrication process for the heater and temperature detector (FIG. 8B) begins by using Silicon wafer (p-type, 18–22 alun-cm, boron concentration~$10^{13}$ $cm^3$) as a substrate for growth of $SlO_2$ thermal oxide (1 μm) (STEP 1). A 0.5 μm metallic Aluminum film is electron beam deposited. Photoresis PR 1827 is applied and spun at 4000 rpm for 30 seconds, patterned (metal 1) and developed. The exposed aluminum is etched in Aluminum etchant and the photoresist stripped to define the metal heater (STEP 2).

Photoresist is spun again and a second lithography is done (metal 2). A 0.15 μm layer of platimun ("Pt") is electron beam deposited. A 0.03 μm thick Titanium metal layer (electron beam deposited) is used as the adhesion layer. The resist and the overlying metal is lifted off by development using Microposit 1112A remover in solution (Shipley Co.). This Platinum metal will be used as the resistive thermal detector. Next, 0.7 μm of Low Temperature Oxide (LTO) of silicon is deposited to act as the barrier layer and the dydrophilic substrate (STEP 4). A third lithography is done and the LTO is etched in Buffered Hydrofluoric Acid to open contacts to the metal contact pads. The further processing steps are done to pattern hydrophobic regions onto the hydrophilic silicon oxide surface.

Hydrophobic Patterning of Silicon Oxide Substrate

A 0.1 μm layer of Chromium metal is electronbeam deposited on the processed water. Photoresist PR 1827 is applied and spun at 2000 rpm for 30 seconds. The resist is patterned (SAM mask) and developed. The exposed Chromium metal is etched in Chromium etchant to expose the silicon oxide and the photoresist is then stripped off (STEP 5). The samples are then cleaned in Acetone, Isopropyl Alcohol and DI water for 10 minutes each, air dried and oven dried at 100° C. for 5 minutes. The samples are then put in 1 wt % octadecyltrichlorosilane (OTS) solution in Toluene for 15–30 minutes. OTS deposits on the samples as a Self Assembled Monolayer (SAM) (STEP 6). The samples are then rinsed in Toluene, Isopropyl alcohol and DI water for 5 minutes each, and then oven dried (100° C., 5 minutes). Next, they are put in Chromium etchant to remove the Chromium layer below. The SAM on the Chromium metal gets lifted off as a result of this. The samples were then rinsed in DI water and air dried, resulting in regions of intact hydrophobic regions on a hydrophilic oxide substrate (STEP 7). Heater elements and RTDs have also been fabricated on a quartz substrate. The fabrication steps are similar to that of the silicon processing steps.

Glass Channel and Chamber Fabrication

Figure 8C:
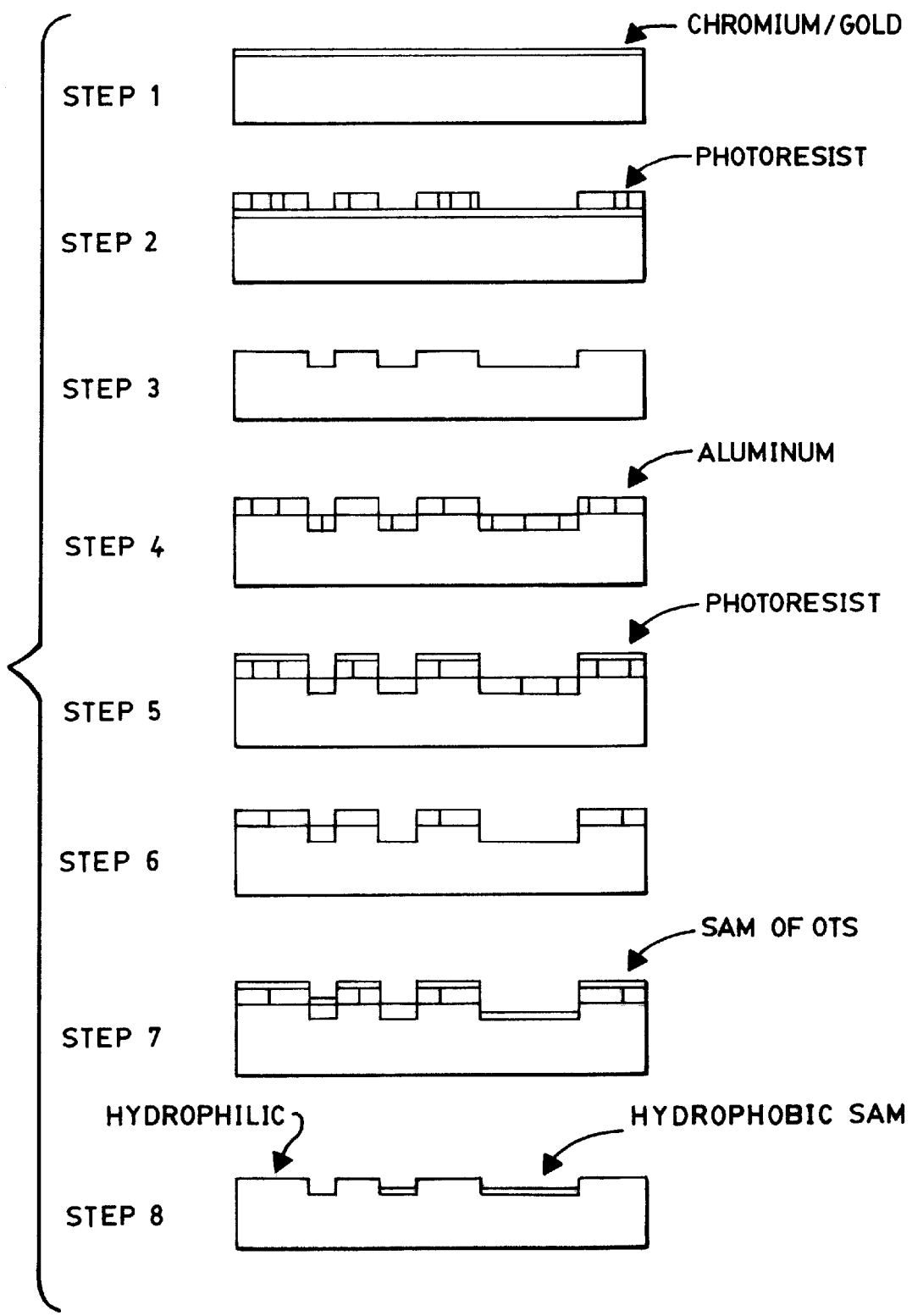
FIG. 8C is a schematic showing one embodiment of the fabrication steps for fabrication of components in glass.

The channel and the chamber fabrication (FIG. 8C) begins by depositing 0.4 $\mu$m metallic layer of Gold (Electron beam deposition) on the surface of 500 $\mu$m thick glass wafer (Dow Corning 7740) (STEP 1). A 0.06 $\mu$m layer of chromium is used as the adhesion layer. Photoresist is applied and patterned using glass mask 1 and developed (STEP 2). The metal layers are etched in gold etchant (Gold Etchant TFA, Transene Co.) and Chromium etchant (CR-14, Cyantec Inc.). The accessible glass is then etched in a solution of freshly prepared hydrofluoric and nitric acid (7:3, v/v). The etch rate is approximately 5 $\mu$m/min and the etch depth is conveniently measured using a surface profilometer. The metal layers are removed (STEP 3) and the wafer rinsed in DI water, air dried and oven dried at 100° C. for 20 minutes. The following processing steps are done for patterning hydrophobic regions onto the glass surface.

Hydrophobic Patterning of Glass Substrate

A 1.5 $\mu$m thick Aluminum layer was electron beam deposited, covering the etched channels and chamber (STEP 4). A thick photoresist (AZ 4620) is applied and spun at 750 rpm for 50 seconds (STEP 5). The resist is patterned (SAM Mask) and developed. The exposed Aluminum is etched in aluminum etchant. The photoresist is stripped off (STEP 6) in hot PRS 2000 (J. T. Baker). The samples are then cleaned in Acetone, Isopropyl alcohol and DI water for 5 minutes each and the water dried off in a 100° C. oven of 10–15 minutes. The samples are then dipped in a 1% OTS solution in Toluene for 10–15 minutes (STEP 7). The SAM deposition was carried out in a Chemical hood. The samples were then rinsed in Toluene, Isopropyl Alcohol and DI water for 5 minutes each. Next, they were put in Aluminum etchant until all metallic aluminum was removed (STEP 8). The samples were then rinsed in DI water and air dried. For the devices with the inlet from the top, holes were drilled by electrochemical discharge drilling.

The glass side was then aligned on top of the silicon side and then bonded together using optical adhesive (SK-9 Lens Bond, Sumers Laboratories, Fort Washington, Pa.). The bond was cured under an ultraviolet light source (365 nm) for 24 hours.

IV. Component Design

The present invention contemplates one or more gel electrophoresis modules as a component of the microscale device. Theoretical and empirical research has indicated that reducing the thickness of the electrophoresis channel leads to improved resolution. Thinner gels dissipate heat more readily and allow higher voltages to be used, with concomitant improvements in separation. The position and width of the electrophoresis detector are also critical to the ultimate resolution of the electrophoresis system. A micromachined electronic detector, such as a photodiode, placed in the underlying silicon substrate can be less than one micron from the gel matrix and can have a width of 5 microns or less. Since the gel length required for the resolution of two migrating bands is proportional to the resolution of the detector, the incorporation of micron-width electronic detectors can reduce the total gel length required for standard genotyping by at least an order of magnitude.

Figure 9A:
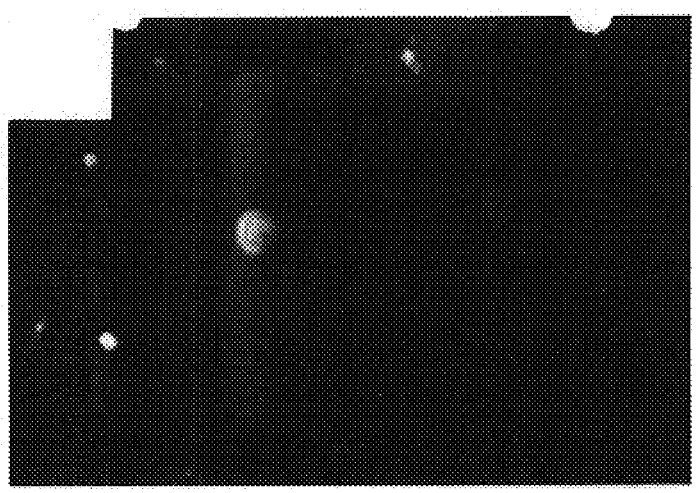
FIG. 9A is a photomicrograph of polyacrylamide gel electrophoresis in a wide etched-glass channel.

To demonstrate that standard gel electrophoresis can operate in micron-diameter channels, modules were fabricated using etched glass channels identical to FIG. 6B and fluorescent-labeled DNA (YOYO intercalating dye). Polyacrylamide gel electrophoresis of a complex DNA mixture is shown in FIG. 9A in a channel 500 $\mu$m wide and 20 $\mu$m deep. The electrophoresis was performed with the positive electrode to the right and the DNA sample applied at the left. The white vertical line is the gel-to-buffer interface. The DNA sample (BluescriptKS digested with MspI) is labeled with intercalating UV-fluorescent dye (YOYO-1) and is visualized under incandescent light. Separation of the component bands is clearly visible less than 300 $\mu$m from the buffer reservoir-to-gel interface. The high resolution of the detector (in this case, a microscope) allowed the use of an unusually short gel, resolving several closely eluting bands.

Figure 6D:
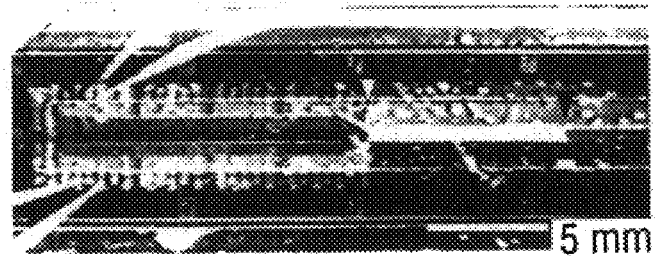
FIG. 6D shows the merging of the microdroplets to form the combined microdroplet. The open arrowheads in the figure indicate the rear meniscus and the filled arrowheads the leading meniscus for each microdroplet.

The present invention contemplates an electrophoresis unit that integrates a micromachined channel and an electronic DNA detector. The channel is constructed using a sacrificial etch process on a single silicon wafer rather than the bonded surface-etch method described earlier. In the sacrificial etch technique, the channel configuration is patterned by depositing on the wafer surface an etch-sensitive material (phosphosilicate glass, $SiO_2.P_x$) with a thickness equivalent to the desired channel height. A triple-layer overlay of plasma-enhanced chemical vapor deposited silicon nitride, undoped polycrystalline silicon, and silicon nitride ($Si_xN_y$/polySi/$Si_xN_y$) completely covers the sacrificial material with the exception of small access holes on the top or sides. A selective liquid etch removes the sacrificial layer material, but not the overlay or the underlying substrate. The sacrificial etch technique results in a complete channel being formed directly on the substrate containing the electronic components (FIGS. 6C and 6D). The 3 $\mu$m deep channel has two buffer reservoirs on either end with integral phosphorus-doped polycrystalline silicon electrodes. The channel height formed by this technique (~3 $\mu$m) is considerably smaller than the height of the bonded structures due to the limitations of the sacrificial layer deposition and the strength of the overlying layer. Note that, for these channel dimensions, liquid drops would have volumes on the order of picoliters.

Figure 9B:
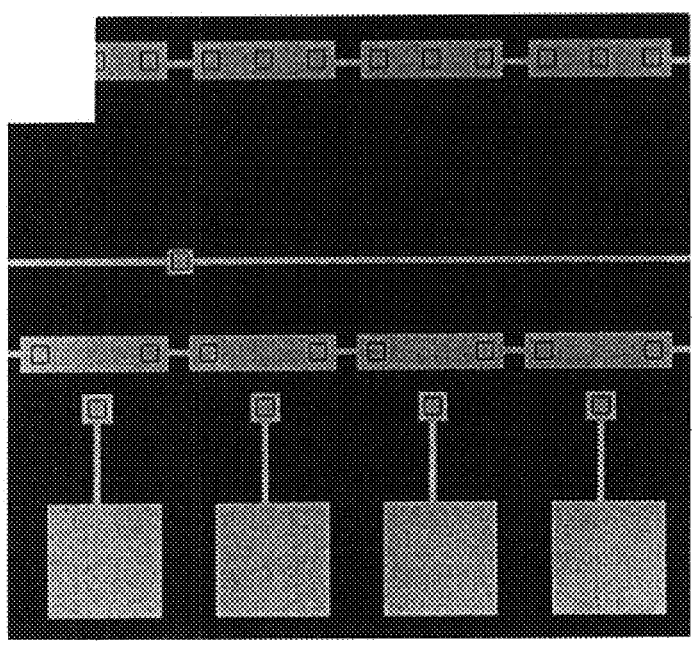
FIG. 9B is a photomicrograph of a set of four doped-diffusion diode radiation detector elements fabricated on a silicon wafer.

FIG. 9B is photomicrograph of a set of four doped-diffusion diode radiation detector elements fabricated on a silicon wafer. For each element, the three parallel dark lines define the diffusion regions of the central the detector flanked by the guard ring shielding electrodes. The diffusion regions are approximately 300 $\mu$m long and 4 $\mu$m wide.

A radiation detector, consisting of a 10 $\mu$m wide "p-n"-type diode with a 5 $\mu$m wide guard ring around the outer edge, is fashioned directly into the silicon substrate underneath the channel. In this implementation, an integral radiation detector was chosen because of (i) high sensitivity (a single decay event), (ii) small aperture dimensions, and (iii) well-know fabrication and response characteristics. On this electrophoresis system, a 1 cm long, 3 $\mu$m thick gel is able to perform as separation on a 80 and a 300 base-pair fragment of DNA. It should be noted that this diode, although currently configured for high-energy beta particle detection, can also operate as a photon detector. With proper wavelength filters and light sources, detection of fluorescence emission may be accommodated with a similar device.

Radiation detectors were prepared as follows. A 200 ½-cm, <100>, float zone, boron-doped, p-type silicon wafer was used as a substrate. Diffused layers of phosphorus ($5\times10^{14}$ $cm^{-2}$) and boron ($1\times10^{15}$ $cm^{-2}$) were ion-implanted onto the sample in lithographically-defined regions; thermal silicon oxide was grown (0.2 $\mu$m at 900° C.) over the, wafer; and contact holes were etched to the diffusion layer using buffered hydrofluoric acid solution (5:1). A 3.3 $\mu$m layer of Microposit 1400-37 photoresist was patterned to define the metal pads; 50 nm chromium followed by 400 nm gold was evaporated over the resist; and the metallization lifted off the regions retaining the resist. A layer of Microposit 1813 photoresist was applied across the wafer and baked for 110° C. for 30 minutes to form an aqueous solution barrier. Radioactive phosphorus ($^{32}$P) decay events could be detected using a sample of labeled DNA in PCR reaction buffer placed on the photoresist layer. The detector was connected to a charge-sensitive preamplifier (EV-Products 550A), followed by a linear shaping amplifier and a standard oscilloscope.

Figure 9C:
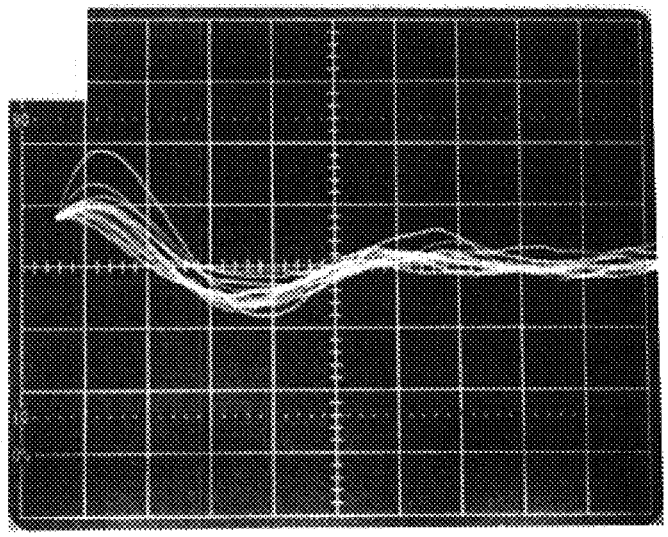
FIG. 9C is an oscilloscope trace of output from the radiation detector showing individual decay events from $^{32}$P-labeled DNA.

FIG. 9C shows an oscilloscope trace of output from the radiation detector showing individual decay events from $^{32}$P-labeled DNA. The aqueous DNA sample was placed directly on the detector and sampled for 30 seconds. The screen is displaying a vertical scale of 0.5V/division and horizontal scale of 20 µsec/division.

Experimental

The following examples serve to illustrate certain preferred embodiments and aspects of the present invention and are not to be construed as limiting the scope thereof.

In the experimental disclosure which follows, the following abbreviations apply: eq (equivalents); M (Molar); VM (micromolar); N (Normal); mol (moles); nmmol (millimoles); gmol (micromoles), nmol (nanomoles); gm (grams); mg (milligrams); µg (micrograms); L (liters); ml (milliliters); µl (microliters); cm (centimeters); mm (millimeters); µm (micrometers); nm (nanometers); ° C. (degrees Centigrade); Ci (Curies); MW (molecular weight); OD (optical density); EDTA (ethylenediamine-tetracetic acid); PAGE (polyacrylamide gel electrophoresis); UV (ultraviolet); V (volts); W (watts); mA (milliamps); bp (base pair); CPM (counts per minute).

EXAMPLE 1

This example describes approaches to the problem of forming a moisture barrier over electrical elements of the microscale device. Initial prototypes employed 5000 angstroms of aluminum and covered it with PECVD SiO$_x$. Upon testing, it was determined that the liquids were penetrating this later and destroying the aluminum heating elements.

Without clear evidence what was causing this problem, it was hypothesized that the step height of the aluminum was causing cracks in the passivation layer (the oxide). In order to alleviate the cracking problem, a layer of Si$_x$N$_y$ was tried between two layers of SiO$_x$, with the thought that the additional thickness would overcome the cracking caused by the step height. It did not.

As a follow-up approach, a thinner layer (500 angstroms) of aluminum was tried. This gave ⅒th the step height of the original prototype devices. On top of this aluminum, a triple layer of SiO$_x$, Si$_x$N$_y$, and SiO$_x$ was employed. Moreover, the process for making the Si$_x$N$_y$ layer was changed to one which would give a more dense layer. This appeared to solve the problem. However, the thinner layer of aluminum created a higher resistance which was not acceptable. It was determined that one needed a way to generate thicker layers of aluminum for lower resistance, yet keep the surface relatively smooth (planar). An etch back process was used (now called "the inlay process") to accomplish the task. By etching back into a layer of SiO$_x$ depositing aluminum in the resulting cavity, then stripping the resist mask, a surface was obtained with a step height low enough to prevent cracking of the passivation layers.

It was also discovered that the metal bonding pads were not adhering well to the initial PECVD SiO$_x$ layer. To overcome the problem, the process was modified by using a wet thermal SiO$_2$ layer.

EXAMPLE 2

This example describes approaches to enhancing droplet motion by surface to treatment. In this regard, the principle of using surface tension to cause droplets to move may be applied to either hydrophilic or hydrophobic surfaces. Glass, for instance, is naturally hydrophilic with a near zero contact angle with water. Because the oxide coating of the present invention is made principally of the same material as glass, it was expected that the devices would also exhibit near zero angles. It was discovered, however, that the actual construction materials had contact angles far from zero, thus enhancing the effects of contact angle hysteresis (discussed in greater detail in Example 3). For instance, water gave a contact angle (static) of ~42° on polyamide, ~41 on SiO$_2$ (major component of most glasses), ~62° on silicone spray. To enhance the surface effectiveness, several treatment processes for both hydrophilic and hydrophobic surfaces were tried, as described below.

To improve the hydrophilicity of a surface, several cleaning procedures were tried. It has been reported that surface contamination and/or roughness can reduce the hydrophilicity of surfaces. Therefore, a high concentration chromic acid cleaning, a high concentration sulfuric acid cleaning, a baking procedure (to 600° C. for 8 hrs. to burn off contaminates), and surface coatings were tried. The acid cleaning procedures were not as effective as the baking procedure; however, neither proved to be compatible with the devices since the concentrated acids would attack the aluminum pads and the high temperature could peal the aluminum (melting pt. ~660° C.) or break the adhesive bond between the heater chip and the channel.

Rain-X antifog (commercially available) as a treatment was observed to work. This is a surface treatment which makes surfaces hydrophilic. Although, the resulting surfaces may not be 0°, by using this coating the entire surface gets treated giving a uniform surface for the droplet. Experimentally, it was found that Rain-X antifog treatments greatly enhanced droplet motion experiments using heat. Another such treatment which was tested but which did not work was a material called SilWet. This material is used in the agriculture industry for enhancing the wetting of plants with agricultural sprays.

To obtain hydrophobic surfaces, the present inventors tried coating capillaries with Rain-X and silane treatments. Neither of these gave angles much greater than 90°, therefore, would not work with this mechanism. These treatments would have to have given angles ~180° to be useful for hydrophobic studies of motion. Eventually, it was discovered that one could apply a teflon coating that was sufficiently hydrophobic to possibly warrant future tests.

EXAMPLE 3

This example describes approaches to droplet motion by heat treatment. As noted previously (above), the contact angle on the advancing end of a liquid droplet in motion (known as the advancing contact angle) is greater that the that on the receding end (receding contact angle). In the case of a hydrophilic surface—such as water on glass—this tends to create a back pressure countering attempts at forward motion by heating the back side of a droplet. This is best shown by a simple model describing laminar flow through a channel.

| Average Flow Through a Circular Channel: | |
|---|---|
| $\{v\} =$ | $-\Delta P \cdot [R^2/(8\mu L)]$ |
| where: $\Delta =$ | value at back - value at front end of droplet |
| $\Delta P =$ | $(1/R) \cdot (\Delta G) =$ pressure difference between droplet ends |
| $\Delta G =$ | change in surface tension between the ends of the droplet. |
| $R =$ | channel radius |
| $L =$ | droplet length |
| $\mu =$ | viscosity |

Also, for water, $\Delta G = -$constant$\cdot \Delta T$, where temperature increases lower the surface tension of most liquids (constant=0.16 dyn/cm for water).

| Therefore: | |
|---|---|
| $\{v\} =$ | $-(\Delta G) \cdot (1/R) \cdot [R^2/(8\mu L)] = [-0.16 \cdot \Delta T \cdot R/(8\mu L)]$ |
| where: $\Delta T =$ | $T_{back} - T_{front}$ |
| giving: $\{v\} =$ | $[0.16 \cdot R/(8\mu L)] \cdot (T_{back} - T_{front})$. | giving:

$$(v) = [0.16 \cdot R/(8\mu L)] \cdot (T_{back} - T_{front})$$

This expression indicates that any heating on the back end of the droplet (if the front remains at a lower temperature) will cause the liquid droplet to move. This was not the case experimentally, however. By way of studies using glass capillaries, it was found that there was a minimum temperature difference required to move the droplet. This effect is believed to be the result of contact angle hysteresis (CAH). In CAH, the advancing contact angle is greater than the receding contact angle resulting in a sort of back pressure which must be overcome to achieve droplet movement. CAH occurs when the interface is placed in motion (dynamic angles). To account for this effect, it was included in a steady-state (1D) model for flow. For instance, if the advancing angle is 36° and the receding angle is 29° (with the front of the droplet being 25° C.), then the back of the droplet would need to be heated to ~60° C. for a 1 mm long droplet in a 20 μm high channel. This is just one example situation.

It was discovered experimentally, however, that the channel dimension and fluid parameters (other than surface tension) do not affect whether or not the droplet will move. They do determine the magnitude of motion (if it occurs). What does determine whether motion will occur or not is the following inequality:

$$G_{front}/G_{back} > (R_{front}/R_{back}) \cdot (\cos \beta_{back}/\cos \beta_{front})$$

where:

$\beta =$ contact angle.

The present calculations suggest that a ~35° C. difference between the front and back of a droplet should be sufficient to initiate droplet motion in a system with advancing angles of 36° and receding angles of 29° in a 20 μm high channel. Experimental testing of actual devices however, showed that the front of the droplet heats relatively quickly thus reducing the temperature difference needed for movement between the front and the back of the droplet. This effect required us to use higher voltages to obtain droplet motion. Voltages typically in the range of ~30° Volts were found to be required to obtain motion. Further experiments showed that the resulting temperature difference was ~40° C. between the front and back of the droplet thus corroborating the initial determination of the requirements.

Discrete droplet motion in a micromachined channel structure using thermal gradients is demonstrated in the videorecorded images of FIGS. 6A, 6B, 6C, and 6D. The device consists of a series of aluminum heaters inlaid on a planar silicon dioxide substrate (similar to the structure shown in FIG. 2) and bonded by glue to a wet-etched glass channel (20 μm depth, 500 μm width). Liquid samples were manually loaded into the two channels on the left using a micropipette. Heating the left interface of each droplet propels it toward the intersection of the channels. At the intersection, the droplets meet and join to form a single larger droplet. Note that, since the channel cross-section is 20 μm×500 μm, the volume of each of these droplets can be calculated from their lengths and is approximately 50 nanoliters.

The heaters along the entire surface of the channel shown in FIG. 6 allow it to be used as a thermal reaction chamber in addition to a droplet-motion device. The upper droplet in the figure contains a DNA sample, while the lower contains a restriction digest enzyme (TaqI) and digestion buffer. Following sample merging, the combined droplet was maintained at 65° C. for 30 minutes using the integral heaters and temperature sensors. The completed enzymatic reaction was confirmed by expressing the droplet from the right end of the channel and loading it onto a capillary gel electrophoresis system with a laser-induced fluorescence detector. The chromatogram produced by the silicon-device sample was similar to chromatograms generated from DNA digests runs in a standard polypropylene microreaction vessel (not shown).

EXAMPLE 4

This example describes various approaches for bonding channels to the substrate which contains circuitry for heating and temperature sensing of the device of the present invention (see discussion of two-part construction, above). First attempts involved Polyamide; regular polyamide was unsatisfactory in that it was found the two pieces would not stick together.

Follow-up attempts involved a photo-definable Polyamide. This produced a sticky surface, but would not give a perfect seal along the channel. It was discovered that the solvents released during the final baking process were causing pockets in the polyamide layer. An adhesion layer was needed which would seal by 'curing' and not release solvents.

Several different epoxies and glues were investigated, as listed below.

| | Adhesive | Form | Dries | Texture | Comments |
|---|---|---|---|---|---|
| 1. | Dymax UV Glue | Gel | Clear | Rubbery | Cures on UV exposure. |

-continued

| | Adhesive | Form | Dries | Texture | Comments |
|---|---|---|---|---|---|
| 2. | Carter's Rubber Cement | Goo | Yellow/Clear | Rubbery | Dries quickly and stringy when thinned. |
| 3. | Borden's Krazy Glue | Liquid | Clear | Hard | Thin, dries on first contact. |
| 4. | UHU Bond-All | Gel/Goo | Clear | Hard | Dries quickly and stringy when thin. |
| 5. | Dennison Permanent Glue Stick | Paste | Clear | Hard | Will not flow on applying. |
| 6. | Elmer's Glue-All (Borden) | Thick Liquid | White | Hard | Slow drying. |
| 7. | Liquid Nails | Thin Paste | Wood-like | Hard | Thick, dries quickly when thinned. |
| 8. | Devcon 5-Minute Epoxy | Gel | Yellow/Clear | Hard | Thick, cures on about 5 min. |
| 9. | Scotch Double-Stick Tape | Tape | Clear | Rubbery | Tape. |
| 10. | Dow Corning High Vacuum Grease | Thick Gel | Frosty | Soft | Seals but does not bond. |
| 11. | Nujol Mineral Oil (Perkin Elmer) | Liquid | Clear | Runny | Neither seals (doesn't spread on glass) nor bonds. |
| 12. | Household Goop | Gel/Goo | Clear | Rubbery | Contact cement which dries stringy. |
| 13. | Permatex Weather Strip Cement | Gel/Goo | Yellow/Clear | Rubbery | Dries quickly and stringy when thinned. |
| 14. | Thick Gel Super Glue | Gel | Clear | Hard | Does not cure on contact but does quickly. |
| 15. | DAP Weldwood Contact Cement | Goo | Orange/Clear | Rubbery | Contact cement which gets stringy when thinned. |
| 16. | Scotch (3M) Photo Mount Spray Adhesive | Thin Goo | Yellow/Clear | Rubbery | Spray. 'Gooey' but not stringy. |
| 17. | Silicone Resin (spray) Lacquer (GC Electronics) | Liquid | Clear | Smooth | Spray. Dries to thin, clear, and sealed coating. |

A preferred glue was a UV cured glue, although the process of applying the UV glue is tedious and requires some practice to avoid putting the glue in places where it does not belong, e.g., in the channels.

Hydroxide bonding and screen printing of bonding substances was also attempted. Another option was glass tape, but the high temperatures required to melt the tape appeared to be too high for the present devices.

EXAMPLE 5

This example describes a nucleic acid amplification reaction on a silicon-based substrate. The established DNA biochemistry steps for PCR occur within physiological conditions of ionic strength, temperature, and pH. Thus, the reaction chamber components have design limitations in that there must be compatibility with the DNA, enzymes and other reagents in solution.

Figure 10:
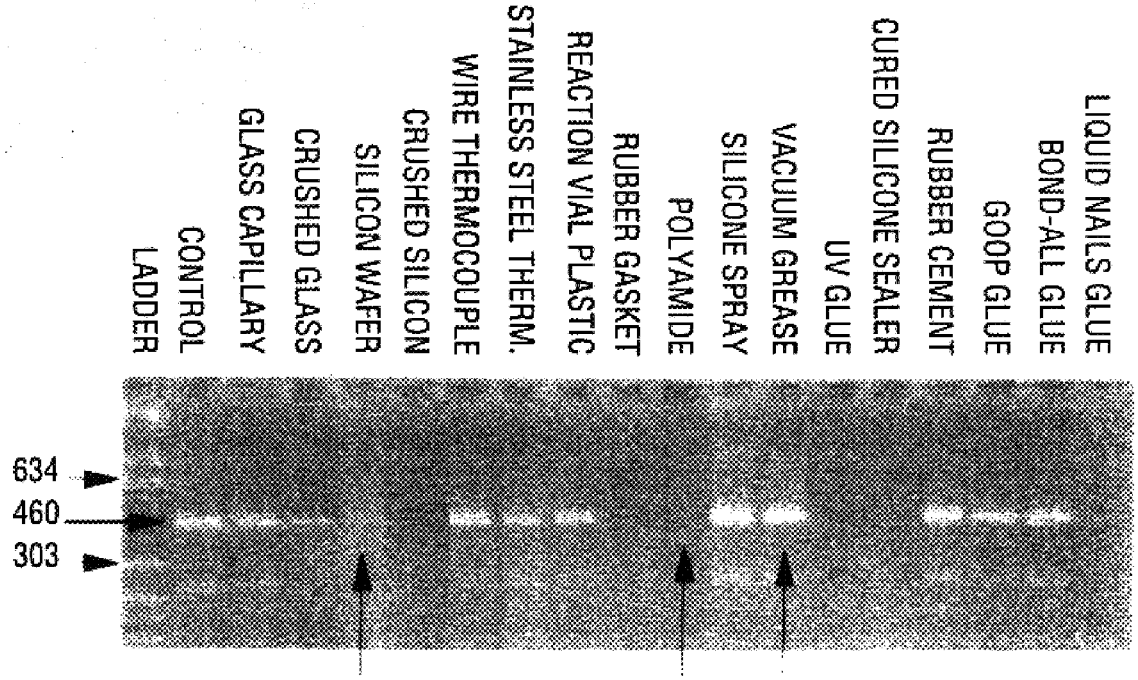
FIG. 10 is a photo of gel electrophoresis of PCR reactions wherein potentially inhibiting components were added directly to the PCR.

To assess biocompatability, components were added to a standard PCR reaction. The results (see FIG. 10) indicated that crystalline silicon may not be the ideal material for biological compatibility. Given these results, it may be desirable to modify the surface of the micromachined silicon substrate with adsorbed surface agents, covalently bonded polymers, or a deposited silicon oxide layer.

To form a biologically compatible heating element, the present inventors began by coating a standard silicon wafer with a 0.5 $\mu$m layer of silicon dioxide. Next, a 0.3 $\mu$m deep, 500 $\mu$m wide channel was etched into the silicon oxide and gold or aluminum was deposited (0.3 $\mu$m thick). This inlay process results in a relatively planar surface and provides a base for deposition of a water-impermeable layer. The impermeable layer is made by a sequence of three plasma enhanced vapor depositions: silicon oxide ($SiO_x$), silicon nitride ($Si_xN_y$), and silicon oxide ($SiO_x$). Since the materials are deposited from the vapor phase the precise stoichiometries are not known. A thin metal heater design was used for this device rather than the doped-silicon resistive heaters previously demonstrated for micromachined PCR reaction chambers, since the narrow metal inlay allows viewing of the liquid sample through a transparent underlying substrate, such as glass or quartz. Also, the use of several independent heating elements permits a small number to operate as highly accurate resistive temperature sensors, while the majority of elements are functioning as heaters.

A device fabricated with metal resistive heaters and oxide/nitride/oxide coating was tested for biological compatibility and temperature control by using PCR amplification of a known DNA template sample. The reaction was carried out on the planar device using twenty microliters of PCR reaction mix covered with mineral oil to prevent evaporation. The reaction mixture was cycled through a standard 35-cycle PCR temperature cycling regime using the integral temperature sensors linked to a programmable controller. Since the reaction volume was significantly larger than intended for the original heater design, a polypropylene ring was cemented to the heater surface to serve as a sample containment chamber. In all test cases, the presence of amplified reaction products indicated that the silicon dioxide surface and the heater design did not inhibit the reaction. Parallel amplification experiments performed on a commercial PCR thermocycler gave similar results. A series of PCR compatibility tests indicated that the reaction on the device is very sensitive to controller settings and to the final surface material in contact with the sample (not shown).

From the above it should be evident that the present invention can be adapted for high-volume projects, such as genotyping. The microdroplet transport avoids the current inefficiencies in liquid handling and mixing of reagents. Moreover, the devices are not limited by the nature of the reactions, including biological reactions.

EXAMPLE 6

Figure 11:
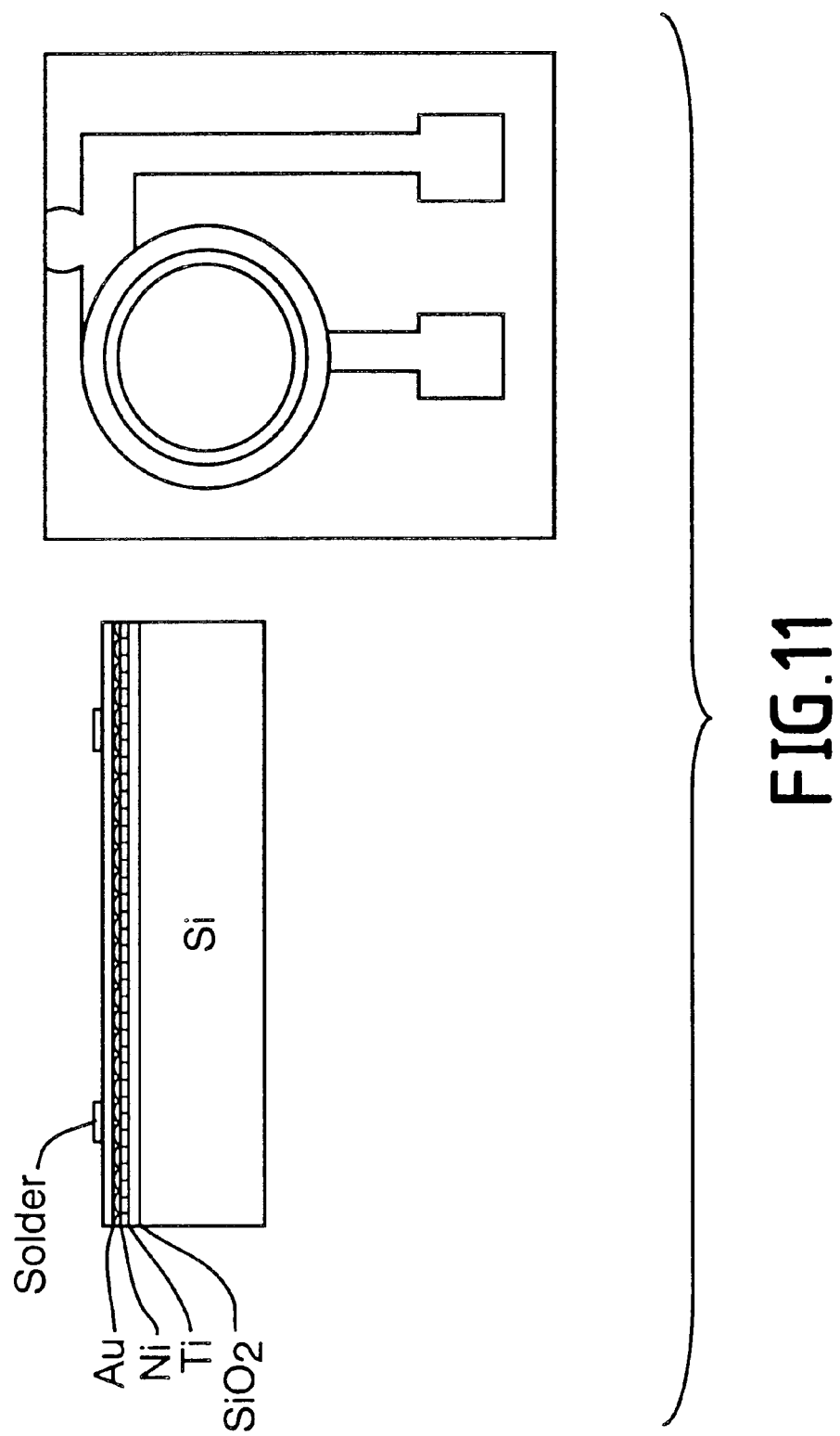
FIG. 11 is one embodiment of a test device for the present invention.

In this example, a test structure is fabricated (FIG. 11). The test structure is very simple (FIG. 11). The main part is constructed from a two mask process with five layers of materials on top of the Si substrate. Proceeding from the lowest to the uppermost layer, the SiO, serves as an insulator between the Si substrate and the other metal layers, which function as solder pads and heating elements. The Ti layer (250A) is for adhesion of Ni. The layers of Ni (1000 A) and Au (1000 A) act as a diffusion barrier for the solder. The Au layer also serves as a wettable pad. Finally, the layer of solder is for bonding two substrates together. The solder will melt by heating the metal layers. Another substrate that will be bonded has the same construction except for the solder.

A thermo-pneumatic microvalve is utilized in the test structure. The schematic and process flow of the microvalve is shown in FIGS. 12A–J. A corrugated diaphragm is chosen for its larger deflection and higher sensitivity. The diaphragm (side length=1000 um, thickness=3 um, boss size length=500 um boss thickness=10 um) has a deflection of 27 um at an applied pressure of 1 atm. This applied pressure is generated by a thermo-pneumatic mechanism, which provides a greater actuation force. A pressure of 1 atm is generated in the cavity between the diaphragm and glass by Freon-11 when it is heated 11° C. above room temperature. As set forth in FIGS. 12A–J, ten masks are anticipated to fabricate the microvalve.

FIG. 9a shows a portion of a silicon substrate 10, which is a p-type (100)-oriented Si wafer of normal thickness and moderate doping (>1 cm). The preferred wafer thickness, however, is ordinarily a function of the wafer diameter. The upper surface 12 of the silicon wafer containing substrate 10 is lapped, polished and cleaned in the normal and accepted manner. Isotropic etching using reactive ion etching (RIE) forms the diaphragm corrugations 14 with photoresist as the masking material.

Figure 12:
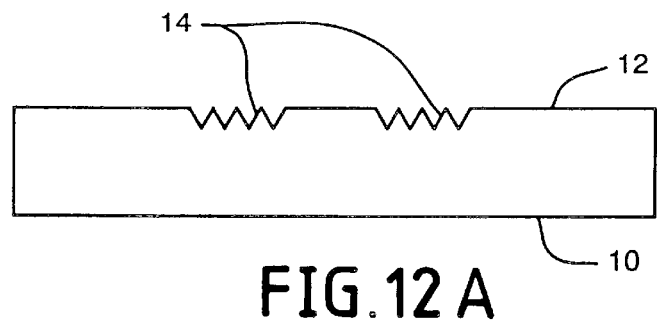
FIGS. 12A–J are schematics for an embodiment for manufacturing a sealable valve of the present invention.
Figure 12:
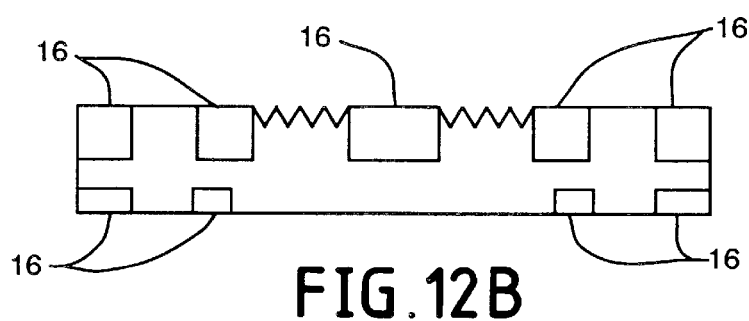
Figure 12:
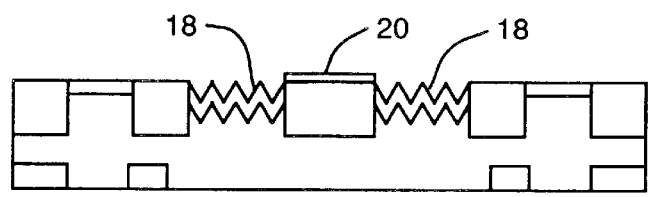
Figure 12:
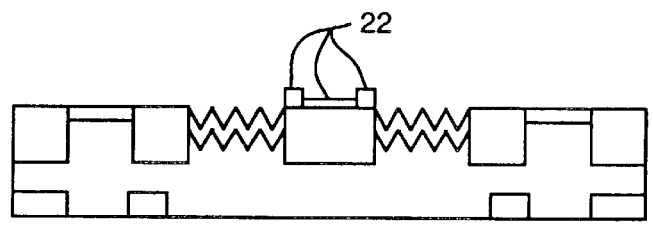

FIG. 12B shows the definition of deep boron diffusion areas 16 to form the rims, center bosses, inlet and outlet holes of the finished device. FIG. 12C shows the deposition of shallow boron diffusion areas 18 to form a diaphragm. The various metal layers, including solder 20, are then deposited. The deep and shallow boron diffusion processes define the shape of the diaphragm and the etch-stop for the dissolved wafer process.

Figure 12E:
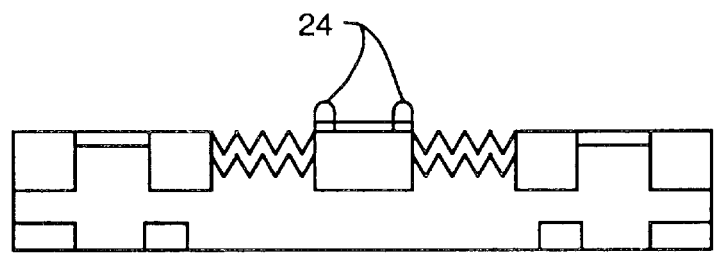
Figure 12F:
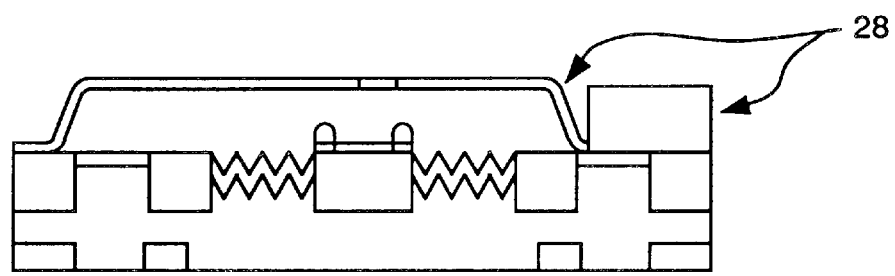
Figure 12G:
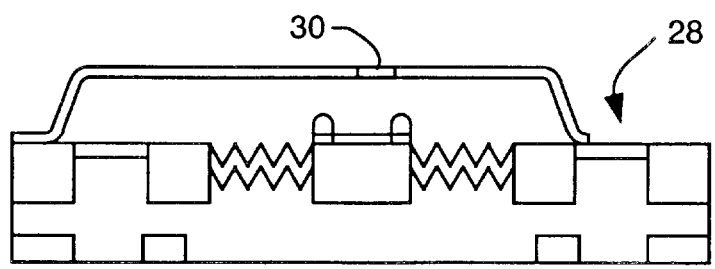
Figure 12:
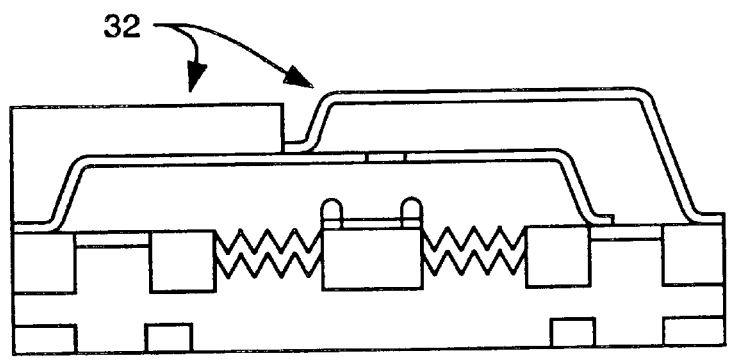
Figure 12:
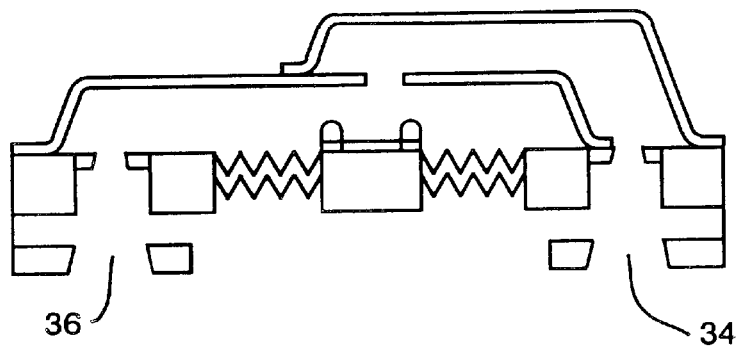
Figure 12:
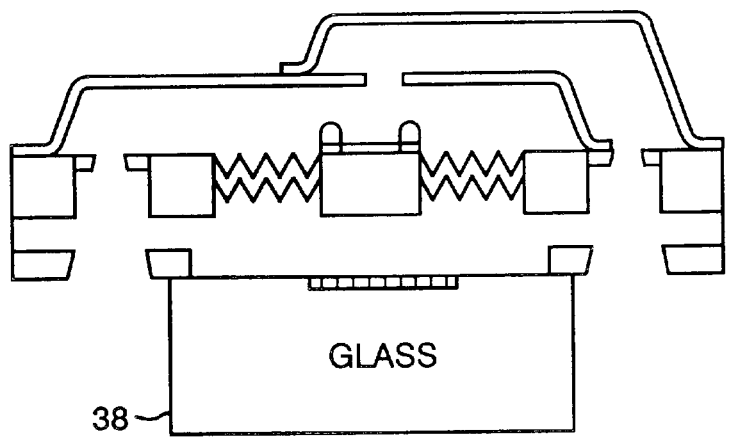

Following this, FIG. 12D shows the definition of oxide layer 22 to serve as insulator of the solder of the finished device. Ti adhesion/Ni/Au barrier and wettable pads 24 are then deposited as shown in FIG. 12E. The solder mold 26 of Ni and photoresist is then defined as shown in FIG. 12F) and the first Ni channel 28 is created by surface-micromachined using photoresist as sacrificial layers. The Ni channel hole is defined using EDP to remove the sacrificial layers, and define an channel hole 30 (FIG. 12G).

A second Ni channel 32 is defined by Ni and photoresist as set forth in FIG. 12H, and inlet 34 and outlet 36 holes are defined using EDP to remove the sacrificial layers (FIG. 12I).

Lastly, a Ti/Pt heater in glass 38 is anodically bonded to the silicon substrate (FIG. 12J). Freon-11 fills the cavity through a hole (not shown) in the glass substrate. This hole is created from a diamond drill bit and sealed with epoxy.

EXAMPLE 7

In this example, a low melting point solder was intended to be utilized in the test structure. Because a universally useful solder-sealed microvalve will be used in a gas phase microanalytical system, it is not desirable to use a high melting point (m.p.) solder (>200° C.), which might affect the gas properties. In addition, a high m.p. solder may affect other components on the device, such as integrated circuits, and increase power consumption. As a result, low melting point solder is required. Bismuth-bearing solders have the lowest m.p.'s of 47–138° C. However, when a test structure was dipped into a pool of solder belonging to this group, all the metal layers dissolved into the solution of solder. Moreover, this solder was not selective in wetting the surface of the test structure.

EXAMPLE 8

In light of the results of the experiment set forth in Example 7, an attempt was made with commonly available 60:40 Sn:Pb solder (m.p. 183° C.). When the test structure was dipped into a solution of this solder, the metal layers remained intact. Furthermore, these layers demonstrated excellent wettability for the solder, i.e. the solder was confined only to the areas of metals.

EXAMPLE 9

Figure 13:
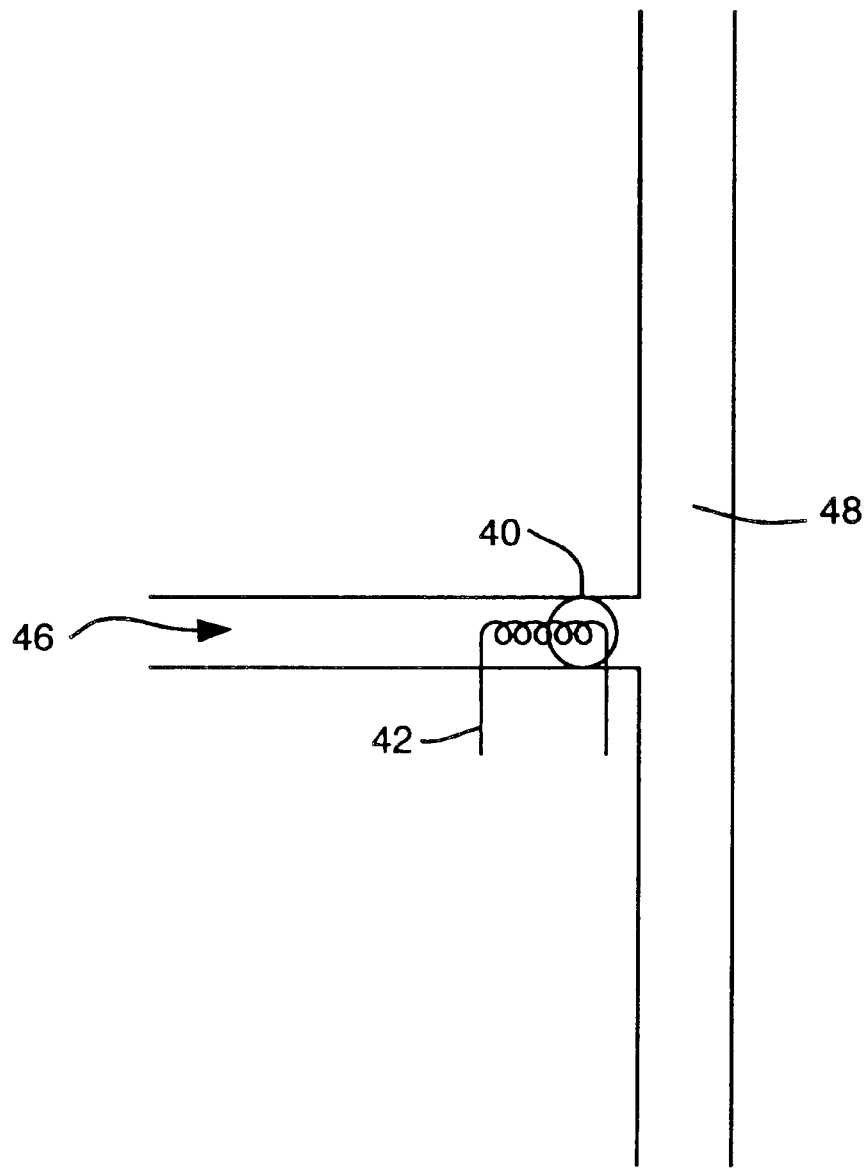
FIG. 13 is a schematic of one embodiment for the layout of the movable sealing means of the present invention.

In this example, a device and method for blocking fluid flow in a channel is described. FIG. 13 sets forth a test schematic for these embodiments. 60:40 Sn:Pb solder 40, associated with a heating element 42, is placed within a side channel 44. The heating element 42 at least partially liquifies the solder 40 and air flow 46 moves the liquified solder from the side channel into a main channel 48 and cooled, blocking the main channel.

EXAMPLE 10

In this example, a device, which was fabricated using lift-off method described above to pattern hydrophobic regions on glass and silicon substrates, was testing for the separation of water droplets. For the device, a patterned metallic thin film was used to expose regions that were chosen to be made hydrophobic on a hydrophilic substrate. Chromium, Gold or Aluminum was used as the metal layer; the choice of the metal being based on process compatibility with other processing steps and step height coverage of the etched channels.

Figure 14:
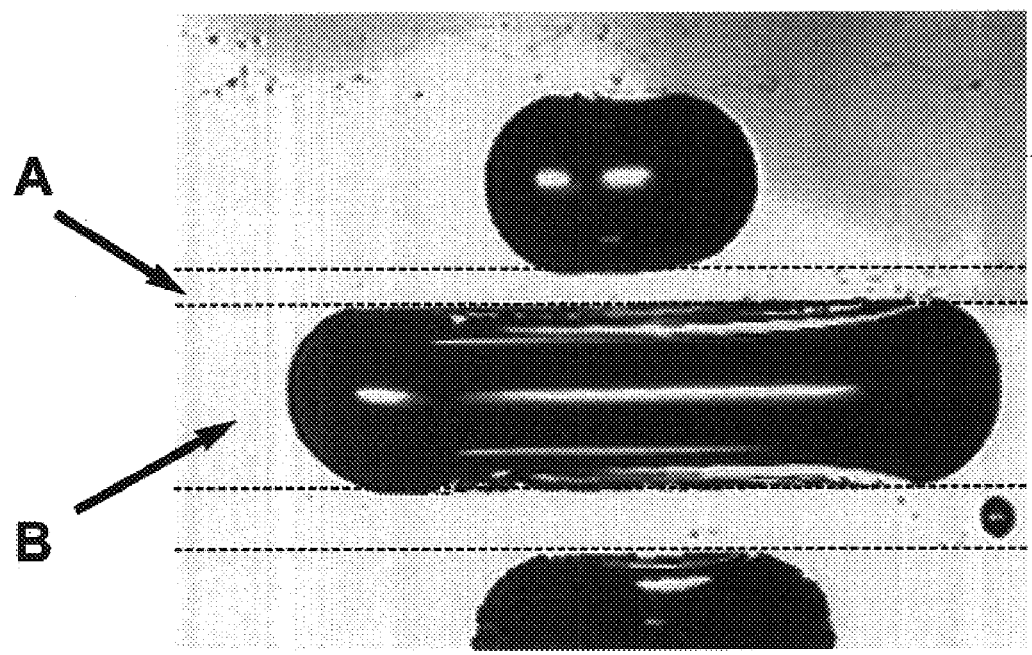
FIG. 14 is a photograph showing water droplets separated by lines of hydrophobic and hydrophilic regions patterned according to the methods of the present invention.

Line widths as narrow as 10 $\mu$m were patterned on silicon substrates using the methods of the present invention. FIG. 14 shows water drops separated by lines of hydrophobic (A) and hydrophilic regions (B) patterned by this new technique (the width of the hydrophilic line in the middle is 1 mm). The contact angle of water on the OTS (SAM) coated silicon oxide surface was measured to be approximately 110°.

One can also define hydrophobic regions in etched channels in glass by performing the lithography using a thick resist. It was found emprically that cleaning of the substrates prior to immersion in the OTS (SAM) solution is important; improper cleaning results in films that partially covers the surface.

EXAMPLE 11

Figure 15A:
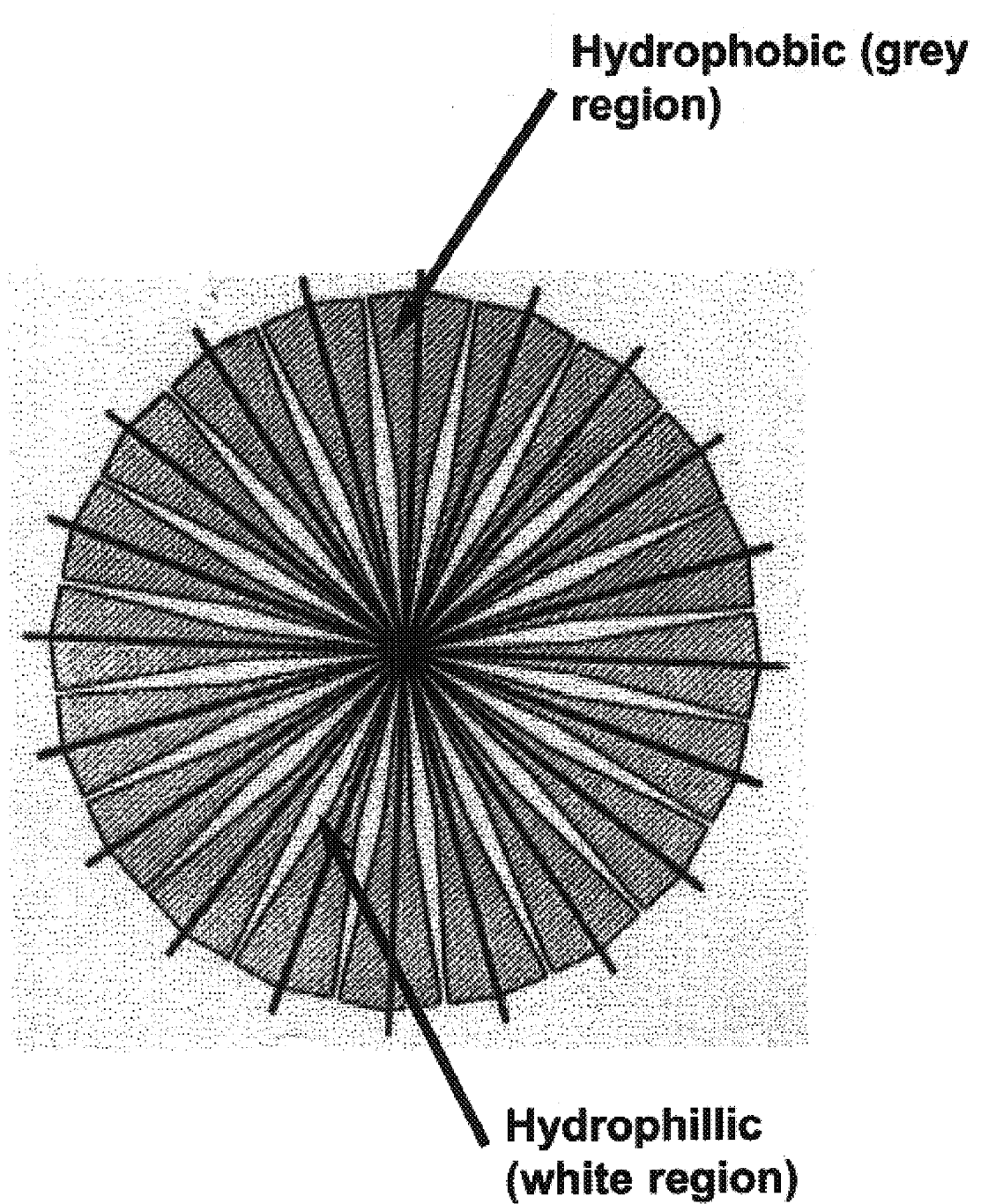
FIG. 15A is photograph showing simple patterning according to the methods of the present invention to create multiple droplets.
Figure 15B:
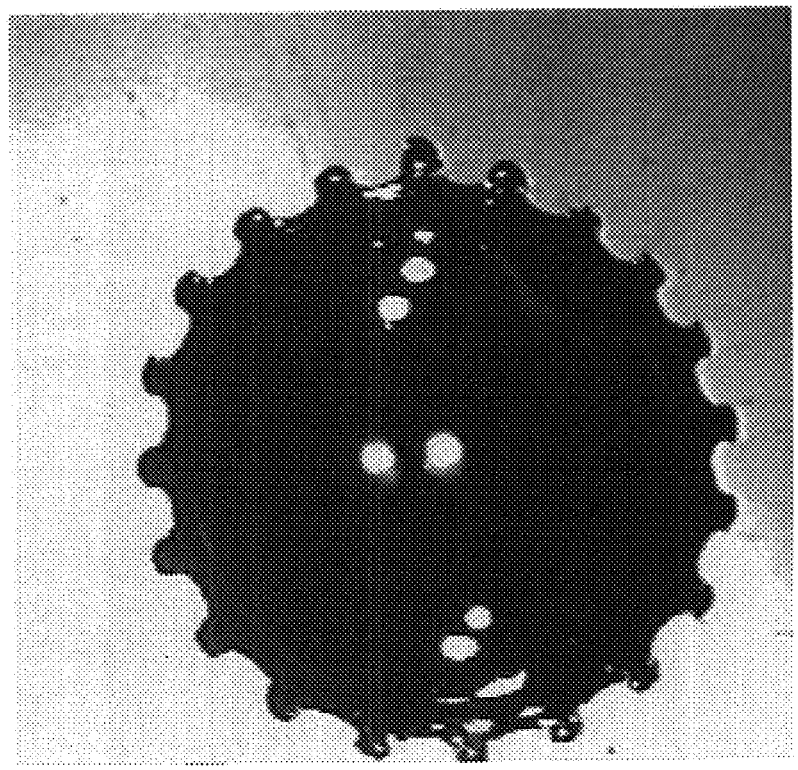
FIG. 15B is photograph showing simple patterning according to the methods of the present invention to create multiple droplets.
Figure 15C:
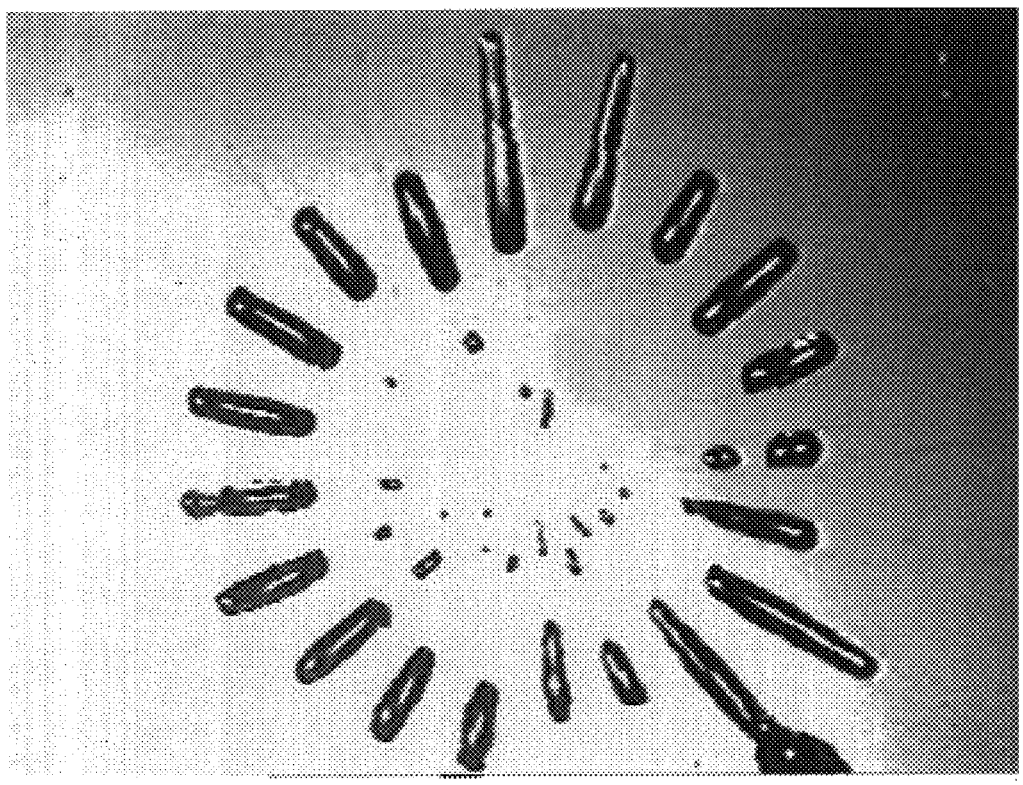
FIG. 15C is photograph showing simple patterning according to the methods of the present invention to create multiple droplets.

The results of Example 10, above, demonstrate that hydrophobic and hydrophilic patterns enable one to define and control the placement of aqueous liquids, and more specifically microdroplets of such liquids, on a substrate surface. FIGS. 15A, 15B, and 15C show a simple use of this patterning technique to split a liquid droplet into multiple liquid droplets. A concentric pattern of alternating hydrophobic (dark) and hydrophilic (white) sectors was imparted to a silicon substrate (FIG. 15A; the diameter of the circle is 1 cm) using the methods of the present invention as described above. A water drop was placed on the pattern (FIG. 15B) and the excess water pulled away using a pipet, resulting in multiple drops separated from each other (FIG. 15C).

EXAMPLE 12

In this example, experiments are describe to position a water front inside a channel using straight channels (depth ranging from 20–40 μm and width between 100–500 μm) with a 500 μm wide hydrophobic region (or patch) patterned a few millimeters away from the side inlet. Water was placed at the inlet using a sequencing pipette (Sigma, least count 0.5 μl) and was drawn into the channel by surface forces. The water front stopped at the hydrophobic patch if a controlled amount of liquid was placed at the inlet. However, if the channels were overloaded, the liquid would tend to overrun the hydrophobic patch. This behavior was prominent in the channels with smaller cross-section.

To eliminate the over-running of the liquid over the patches, an overflow channel was introduced in the design to stop the water running over the hydrophobic patch (such as that shown in FIGS. 3A and 3B). The dimensions of the channels varied in depth and width as before. Water placed at the inlet is drawn in and splits into two streams at the intersection point. The two fronts move with almost equal velocity until the front in the main channel reaches the hydrophobic patch. The front in the main channel stopped at the hydrophobic patch; however, the other front continued to move to accommodate the excess injected water. Using this overflow channel design, one can successfully stop aqueous liquids for the full range of variation in channel dimensions.

EXAMPLE 13

Figure 16A:
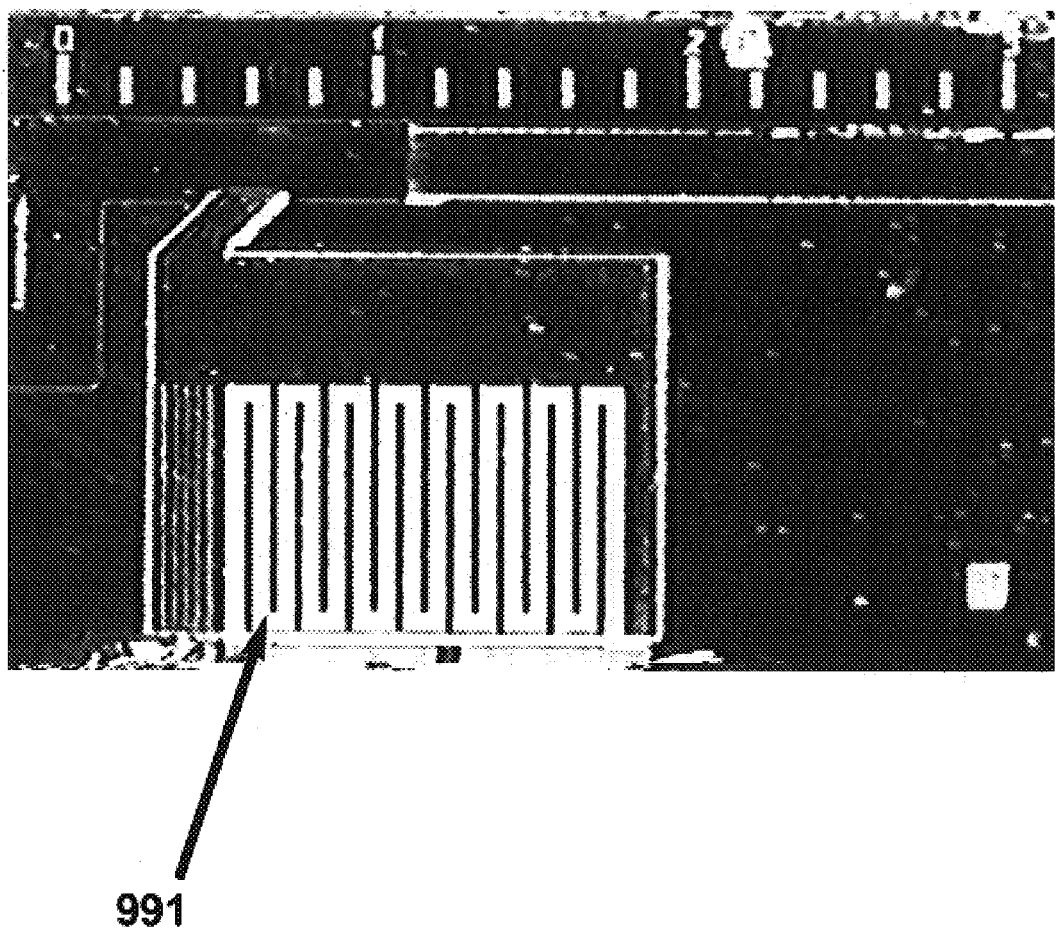
FIG. 16A presents a photograph of one embodiment of the device of the present invention utilizing a heater.
Figure 16B:
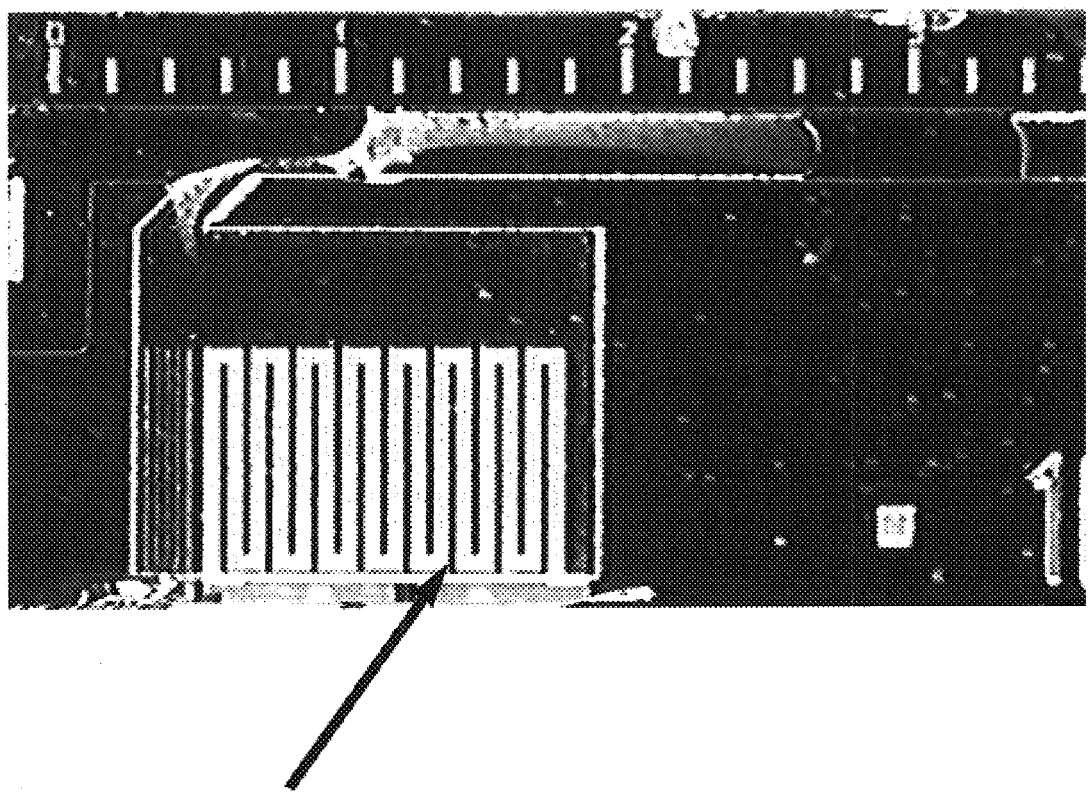
FIG. 16B presents a photograph of one embodiment of the device of the present invention utilizing a heater.
Figure 16C:
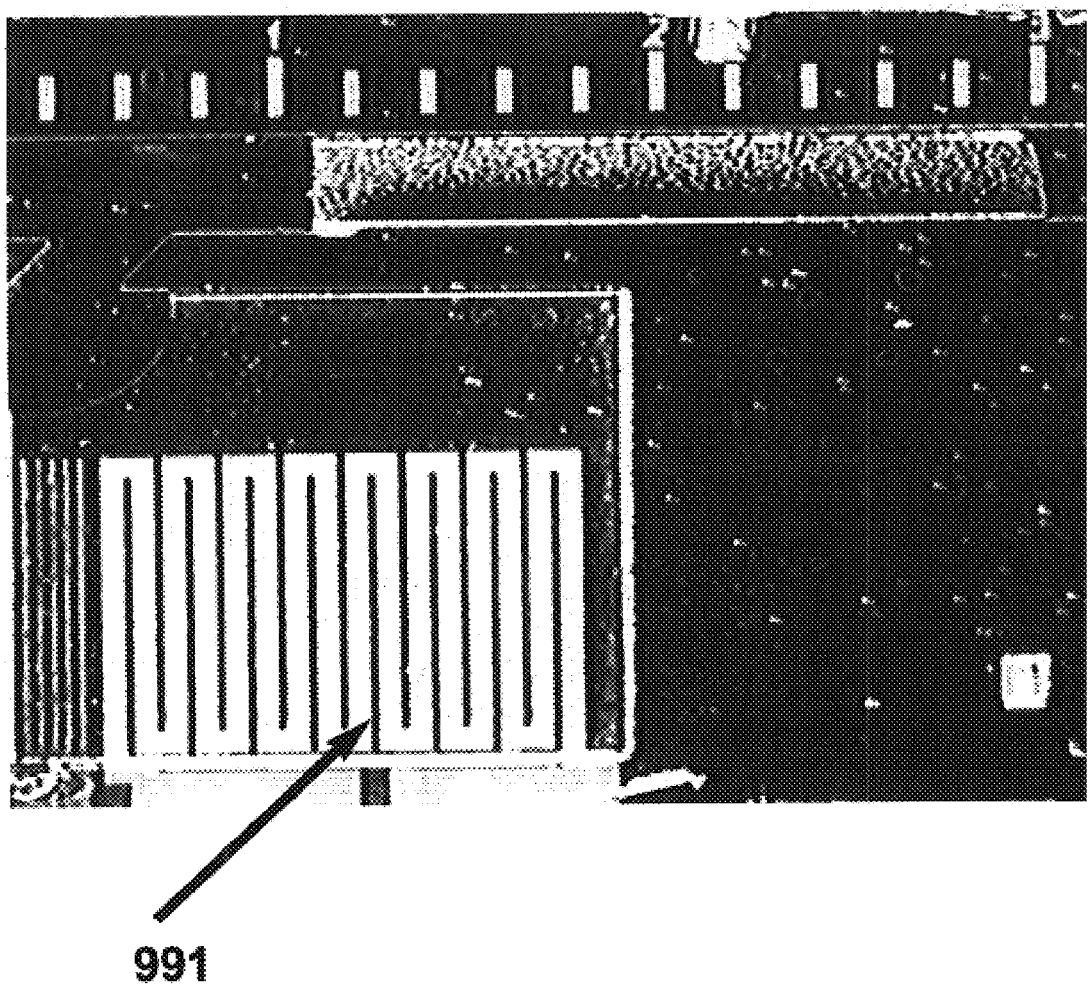
FIG. 16C presents a photograph of one embodiment of the device of the present invention utilizing a heater.
Figure 16D:
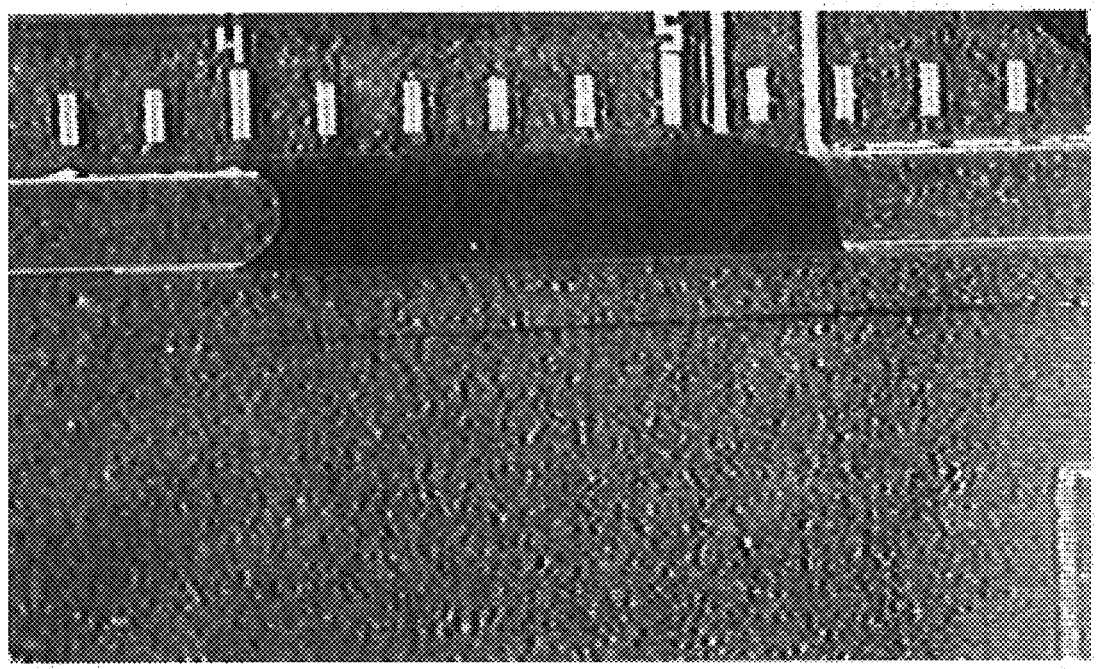
FIG. 16D presents a photograph of one embodiment of the device of the present invention utilizing a heater.
Figure 16E:
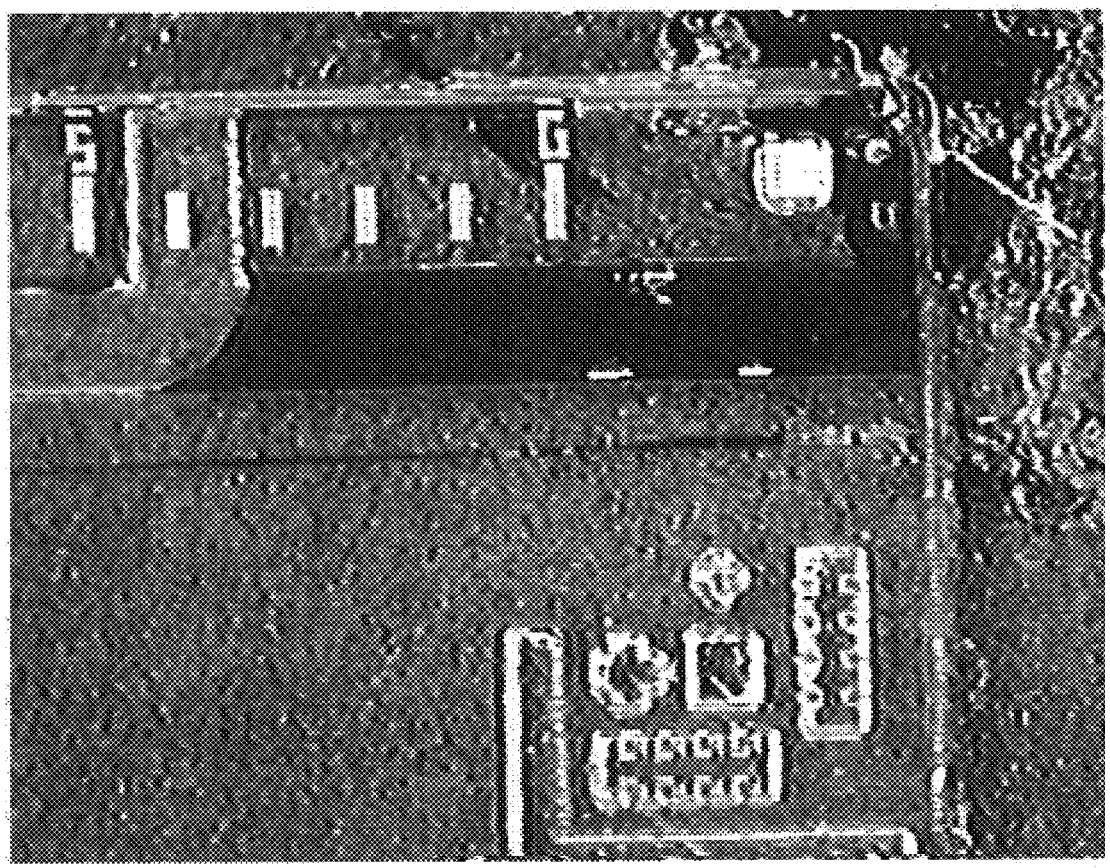
FIG. 16E presents a photograph of one embodiment of the device of the present invention utilizing a heater.
Figure 16:
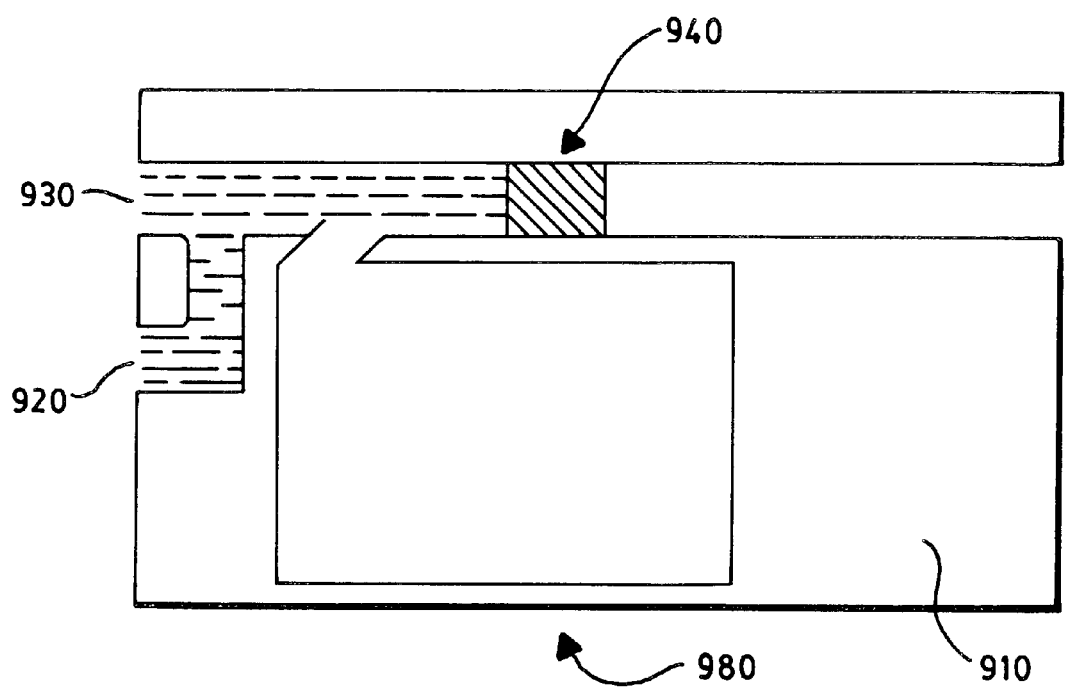
FIG. 16F presents a schematic of one embodiment of the device of the present invention utilizing a heater.
FIG. 16G presents a schematic of one embodiment of the device of the present invention utilizing a heater.
FIG. 16H presents a schematic of one embodiment of the device of the present invention utilizing a heater.
FIG. 16I presents a schematic of one embodiment of the device of the present invention utilizing a heater.
FIG. 16J presents a schematic of one embodiment of the device of the present invention utilizing a heater.
Figure 16G:
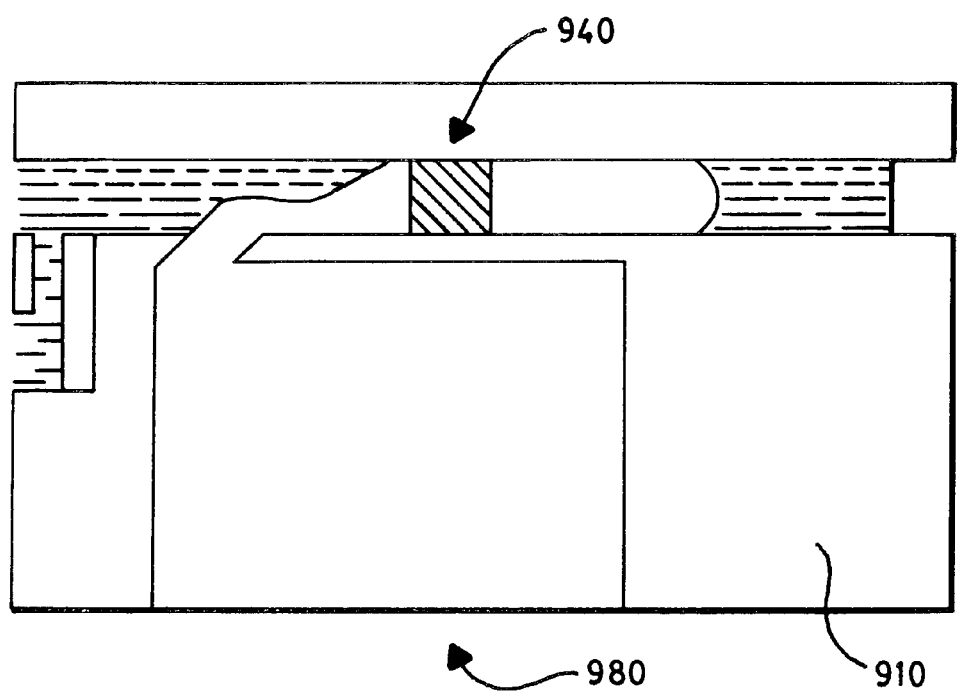
Figure 16:
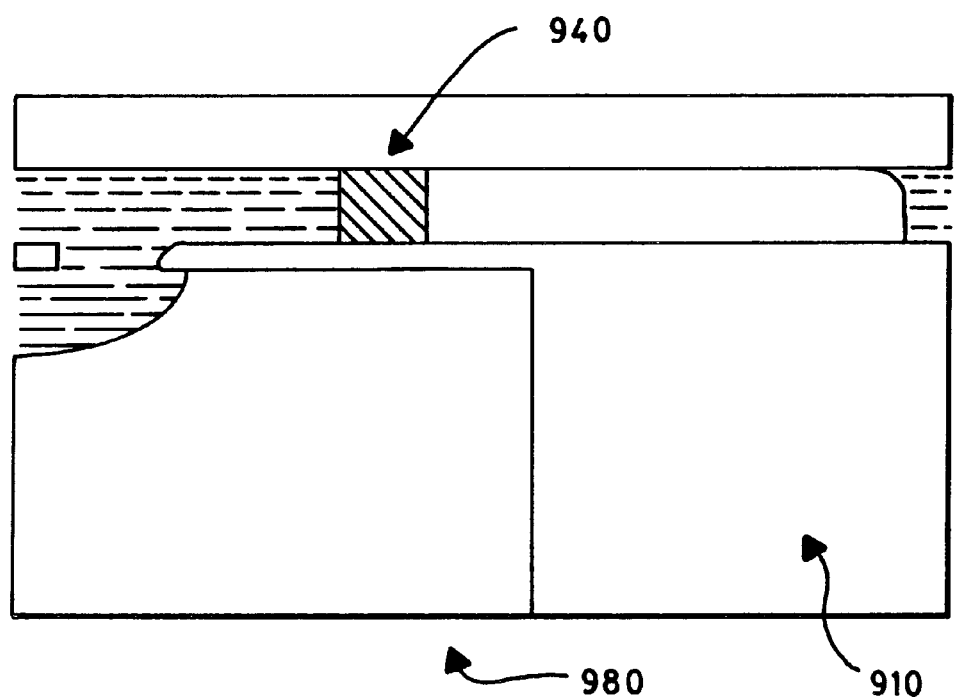
Figure 16I:
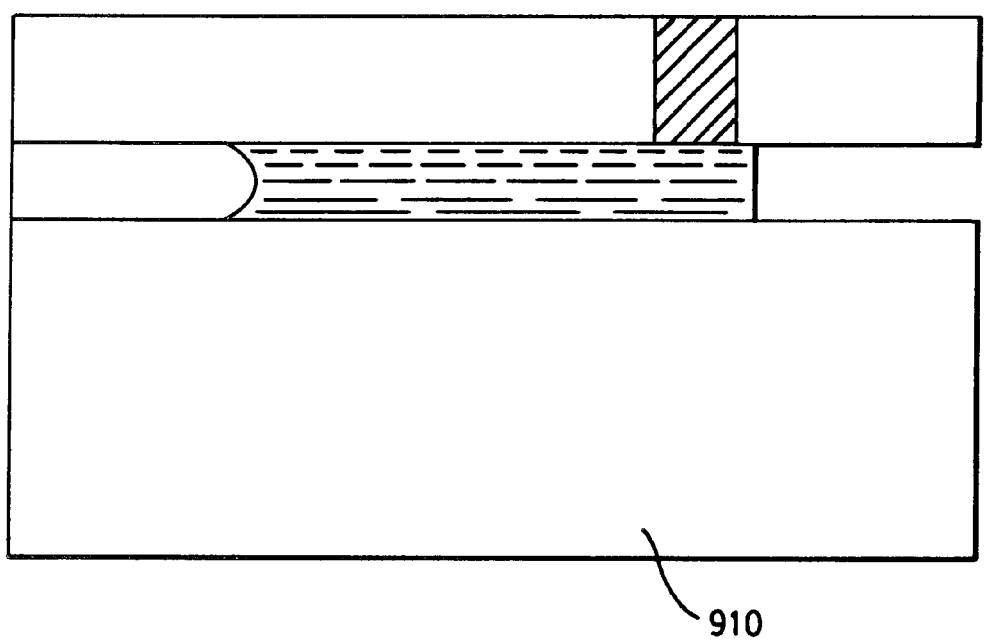
Figure 16:
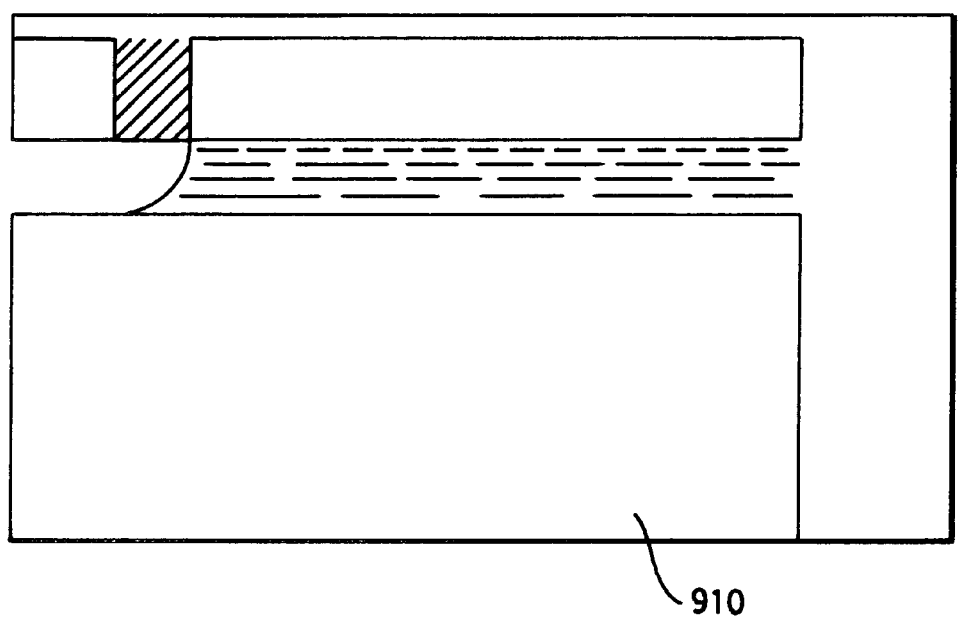

FIGS. 16A–J are schematics and photographs of one embodiment of the device (910) of the present invention (in operation) utilizing a heater. FIGS. 16A and 16F show that liquid placed at the inlet (920) stops at the hydrophobic interfaces, and more specifically, stops at the liquid-abutting hydrophobic region (940). The inlet (920) and overflow (930) ports were blocked or heavily loaded with excess liquid to ensure that the pressure generated acts only in the direction away from the inlet holes. The heater resistor (991) was actuated by an applied voltage. The flow of current caused resistive heating and subsequently increases the air temperature in the chamber (980) and, therefore, the pressure. After the pressure builds up to a particular value, a microdrop splits and moves beyond the hydrophobic patch (FIGS. 16B and 16G). The drop keeps moving as long as the heater is kept on; the drop velocity decreases as it moves further away. While it is not intended that the present invention be limited by the mechanism by which this takes place, it is believed that the added volume (the volume by which the drop has moved) brings about a decrease in the pressure.

To stop or block the moving drop at a location, two strategies can be employed. In the first method, the inlet and overflow ports were opened to the atmosphere and the heater was slowly turned off. The temperature inside the chamber falls quickly to around room temperature, thereby reducing the pressure inside the chamber. The water from the inlet flows into the chamber to relieve the pressure (FIGS. 16C and 16H). In the second method, a hydrophobic vent was placed away from the chamber to the right. As soon as the moving drop goes past the hydrophobic vent (FIGS. 16D and 16I), the drop stops moving farther (FIGS. 16E and 16J). Cooling the chamber to room temperature at this instant will cause air to flow back through the vent to relieve the low pressure in the chamber.

From the above, it should be clear that the compositions, devices and methods of the present invention permit on-chip actuation using etched chambers, channels and heaters. There is no requirement for mechanical moving parts and the patterns are readily fabricated. While the operations described above have been for simple designs, the present invention contemplates more complicated devices involving the introduction of multiple samples and the movement of multiple microdroplets (including simultaneous movement of separate and discrete droplets).

We claim:

1. A device comprising first and second side channels attached to a microdroplet transport channel etched in substrate so as to create first and second intersections, said first and second side channels having hydrophobic surfaces said microdroplet transport channel comprising a hydrophobic region and liquid abutting said hydrophobic region, said liquid extending through said first intersection without entering said first side channel wherein said hydrophobic region is positioned in said microdroplet transport channel between said first and second side channels.

2. The device of claim 1, wherein said microdroplet transport channel is between 5 and 20 μm in depth and between 20 and 1000 μm in width.

3. A device comprising first and second side channels attached to a microdroplet transport channel so as to create first and second intersections, said first and second side channels having hydrophobic surfaces, said microdroplet transport channel comprising i) first and second ends, said first end comprising a liquid inlet port ii) a hydrophobic region disposed within said microdroplet transport channel between said first and second ends, and iii) liquid extending from said inlet port through said first intersection, without entering said first side channel, and abutting said hydrophobic region.

4. The device of claim 3, wherein said device is fabricated from a glass, quartz or silicon substrate.

5. The device of claim 3, wherein said microdroplet transport channel is between 5 and 20 μm in depth and between 20 and 1000 μm in width.

* * * * *